US012500777B2

(12) United States Patent
Kojima et al.

(10) Patent No.: US 12,500,777 B2
(45) Date of Patent: Dec. 16, 2025

(54) SIGNATURE CONTROL METHOD, NON-TRANSITORY COMPUTER-READABLE STORAGE MEDIUM FOR STORING SIGNATURE CONTROL PROGRAM, AND INFORMATION PROCESSING DEVICE

(71) Applicant: FUJITSU LIMITED, Kawasaki (JP)

(72) Inventors: Rikuhiro Kojima, Kawasaki (JP); Dai Yamamoto, Kawasaki (JP); Koichi Yasaki, Kawasaki (JP); Jumpei Yamaguchi, Kawasaki (JP); Toshiya Shimizu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 138 days.

(21) Appl. No.: 17/983,823

(22) Filed: Nov. 9, 2022

(65) Prior Publication Data

US 2023/0075524 A1 Mar. 9, 2023

Related U.S. Application Data

(63) Continuation of application No. PCT/JP2020/025724, filed on Jun. 30, 2020.

(51) Int. Cl.
*H04L 9/32* (2006.01)

(52) U.S. Cl.
CPC .......... *H04L 9/3247* (2013.01); *H04L 9/3236* (2013.01); *H04L 9/3252* (2013.01)

(58) Field of Classification Search
CPC ... H04L 9/3247; H04L 9/3236; H04L 9/3252; H04L 9/30; H04L 63/0442; H04L 9/3006; H04L 9/006
See application file for complete search history.

(56) References Cited

U.S. PATENT DOCUMENTS 6,601,172 B1 * 7/2003 Epstein ................. H04L 9/3247 713/180
2005/0015600 A1 * 1/2005 Miyazaki ................ G06F 21/64 713/176

(Continued)

FOREIGN PATENT DOCUMENTS

CN 109936442 A * 6/2019
EP 3611872 A1 * 2/2020 ......... G06F 16/1834

(Continued)

OTHER PUBLICATIONS

Maxwell, G., Poelstra, A., Seurin, Y., Wuille, P. "Simple Schnorr multi-signatures with applications to Bitcoin". ACM, Designs, Codes , and Cryptography, vol. 87, Issue 9, p. 2139-2164. Sep. 1, 2019. (Year: 2019).*

(Continued)

*Primary Examiner* — Hadi S Armouche
(74) *Attorney, Agent, or Firm* — Fujitsu Intellectual Property Center

(57) ABSTRACT

A signature control method implemented by a computer, the signature control method including: acquiring, by a processor circuit of the computer, a plurality of pieces of document information and signature information that corresponds to each piece of document information of the plurality of pieces of document information; generating, by the processor circuit of the computer, aggregate signature information obtained by aggregating the signature information that corresponds to the each piece of document information of the plurality of acquired pieces of document information on a basis of the plurality of acquired pieces of document information; and outputting, by the processor circuit of the computer, the generated aggregate signature information in association with aggregate public key information obtained by aggregating public key information that corresponds to (Continued)

the each piece of document information of the plurality of pieces of document information and the plurality of pieces of document information.

13 Claims, 29 Drawing Sheets

(56) References Cited

U.S. PATENT DOCUMENTS

| | | | | |
|---|---|---|---|---|
| 2005/0262353 | A1* | 11/2005 | Gentry | H04L 9/3247 713/176 |
| 2006/0288216 | A1* | 12/2006 | Buhler | H04L 9/3247 713/181 |
| 2007/0106908 | A1* | 5/2007 | Miyazaki | G06F 21/64 713/189 |
| 2008/0069347 | A1* | 3/2008 | Brown | H04L 9/3066 380/45 |
| 2009/0265558 | A1* | 10/2009 | Izu | H04L 9/3247 713/176 |
| 2020/0076586 | A1* | 3/2020 | Zhang | H04L 9/0833 |
| 2020/0127849 | A1* | 4/2020 | Lakk | H04L 9/50 |
| 2021/0036853 | A1* | 2/2021 | Perlman | H04L 9/3268 |
| 2021/0117671 | A1* | 4/2021 | Decoux | G06F 16/22 |

FOREIGN PATENT DOCUMENTS

| | | | | |
|---|---|---|---|---|
| JP | 2006060722 | A | * | 3/2006 |
| JP | 2010087590 | A | * | 4/2010 |
| JP | 2013-118706 | A | | 6/2013 |
| JP | 2019-212241 | A | | 12/2019 |
| WO | 2008/028291 | A1 | | 3/2008 |

OTHER PUBLICATIONS

Ambrosin, M., Conti, M., Ibrahim, A., Neven, G., Sadeghi, A., Schunter, M. “SANA: Secure and Scalabe Aggregate Network Attestation”. ACM. CCS’16: Proceedings of the 2016 ACM SIGSAC Conference on Computer and Communications Security, p. 731-742. Oct. 24, 2016. (Year: 2016).*

Le, D., Bonnecaze, A., Gabillon, A. “Signtiming scheme based on aggregate signature”. 2008 IEEE International Conference on Intelligence and Security Informatics. Jun. 17-20, 2008. (Year: 2008).*

Boneh, D., Gentry, C., Lynn, B., Shacham, H. “A Survey of Two Signature Aggregation Techniques”. 2003. CryptoBytes. Stanford University. (Year: 2003).*

Le, D. P, Yang, G., Ghorbani, A. “DDH-based Multisignatures with Public Key Aggregation”. Jul. 2, 2019. Cryptology ePrint Archive, Paper 2019/771. https://eprint.iacr.org/2019/771 (Year: 2019).*

Extended European Search Report dated Jul. 25, 2023 for corresponding to European Patent Application No. 20943095.8, 8 pages. *Please note D1-D2 cited herewith, were previously cited in an IDS filed on Nov. 9, 2022.*

Akira Nishiyama, “Use Cases and Issues of e-Seal in Japan”, Japan Data Communications Association, Trust Service Forum, Japan, Secom Trust Systems Co., Ltd., Mar. 19, 2019, pp. 1-20 [searched on Jun. 26, 2020] (Total 55 pages) [online] https://www.soumu.go.jp/main_content/000607659.pdf.

Yunlei Zhao, “Aggregation of Gamma-Signatures and Applications to Bitcoin”, Cryptology ePrint Archive: Report 2018/414, Dec. 5, 2018, pp. 1-22 (Total 23 pages) [online] https://eprint.iacr.org/2018/414 (Cited in ISR).

International Search Report and Written Opinion of the International Searching Authority (Form PCT/ISA/210, 220, and 237), mailed in connection with PCT/JP2020/025724 and mailed Oct. 6, 2020 (Total 11 pages).

EPOA—Office Action of European Patent Application No. 20943095.8 dated Aug. 5, 2025. ** Non-Patent Literature documents and EP reference cited in the EPOA were previously submitted in the IDS filed on Nov. 9, 2022 and Sep. 6, 2023 (respectively).

* cited by examiner

200
Private CA SERVER
204
DOCUMENT MANAGEMENT SERVER
205
Public CA SERVER
206
210
201
202
203
SIGNATURE-SIDE TERMINAL
VERIFICATION-SIDE TERMINAL
207
AUTHOR
APPROVER
AUTHORIZER
VERIFIER

| SIGNER | DOCUMENT INFORMATION | SIGNATURE TARGET (HASH VALUE OF DOCUMENT) | PRIVATE KEY | PUBLIC KEY | SIGNATURE INFORMATION |
|---|---|---|---|---|---|
| DOCUMENT AUTHOR Alice | $m_1$: CONTRACT WILL BE MADE AS STATED ABOVE.<br>PERSON RESPONSIBLE FOR DOCUMENT: Alice | $hs_1$ | $x_1$ | $X_1$ | $\sigma_1$ |
| APPROVER Carol | $m_2$: CONTRACT WILL BE MADE AS STATED ABOVE.<br>PERSON RESPONSIBLE FOR DOCUMENT: Alice, Carol | $hs_2$ | $x_2$ | $X_2$ | $\sigma_2$ |
| AUTHORIZER Charlie | $m_3$: CONTRACT WILL BE MADE AS STATED ABOVE.<br>PERSON RESPONSIBLE FOR DOCUMENT: Alice, Carol<br>AUTHORIZATION: Charlie | $hs_3$ | $x_3$ | $X_3$ | $\sigma_3$ |
| CORPORATION (ORGANIZATION) | $m_f$: CONTRACT WILL BE MADE AS STATED ABOVE.<br>PERSON RESPONSIBLE FOR DOCUMENT: Alice, Carol<br>AUTHORIZATION: Charlie<br>+HASH CHAIN INFORMATION:<br>$seed, hs_1, hs_2, chk_{hash}$ | $hs_f$ | ※ | $X'$ | $\sigma'$ |

Private CA SERVER
204
1010
PERSONAL PUBLIC KEY STORAGE UNIT
1001
AGGREGATE PUBLIC KEY GENERATION UNIT
1002
PUBLIC KEY REGISTRATION APPLICATION UNIT
Public CA SERVER
206
900
ORGANIZATION PUBLIC KEY STORAGE UNIT DOCUMENT MANAGEMENT SERVER
205
1110
DOCUMENT WITH SIGNATURE STORAGE UNIT
1101
AGGREGATE SIGNATURE GENERATION UNIT
1102
DATA TRANSMISSION UNIT
VERIFICATION-SIDE TERMINAL
207
910
DOCUMENT WITH AGGREGATE SIGNATURE STORAGE UNIT

| NUMBER OF SIGNATURES | 500 | 1000 | 1500 | 2000 |
| --- | --- | --- | --- | --- |
| METHOD (COMPARATIVE EXAMPLE) | 2.31[s] | 9.38[s] | 20.3[s] | 37.1[s] |
| METHOD (FIG. 17) | 0.785[s] | 1.71[s] | 2.69[s] | 3.45[s] |

| NUMBER OF REGISTERED PUBLIC KEYS | CONVENTIONAL SYSTEM | SIGNATURE CONTROL SYSTEM |
|---|---|---|
| Private CA | N | N |
| Public CA | N | 1 |

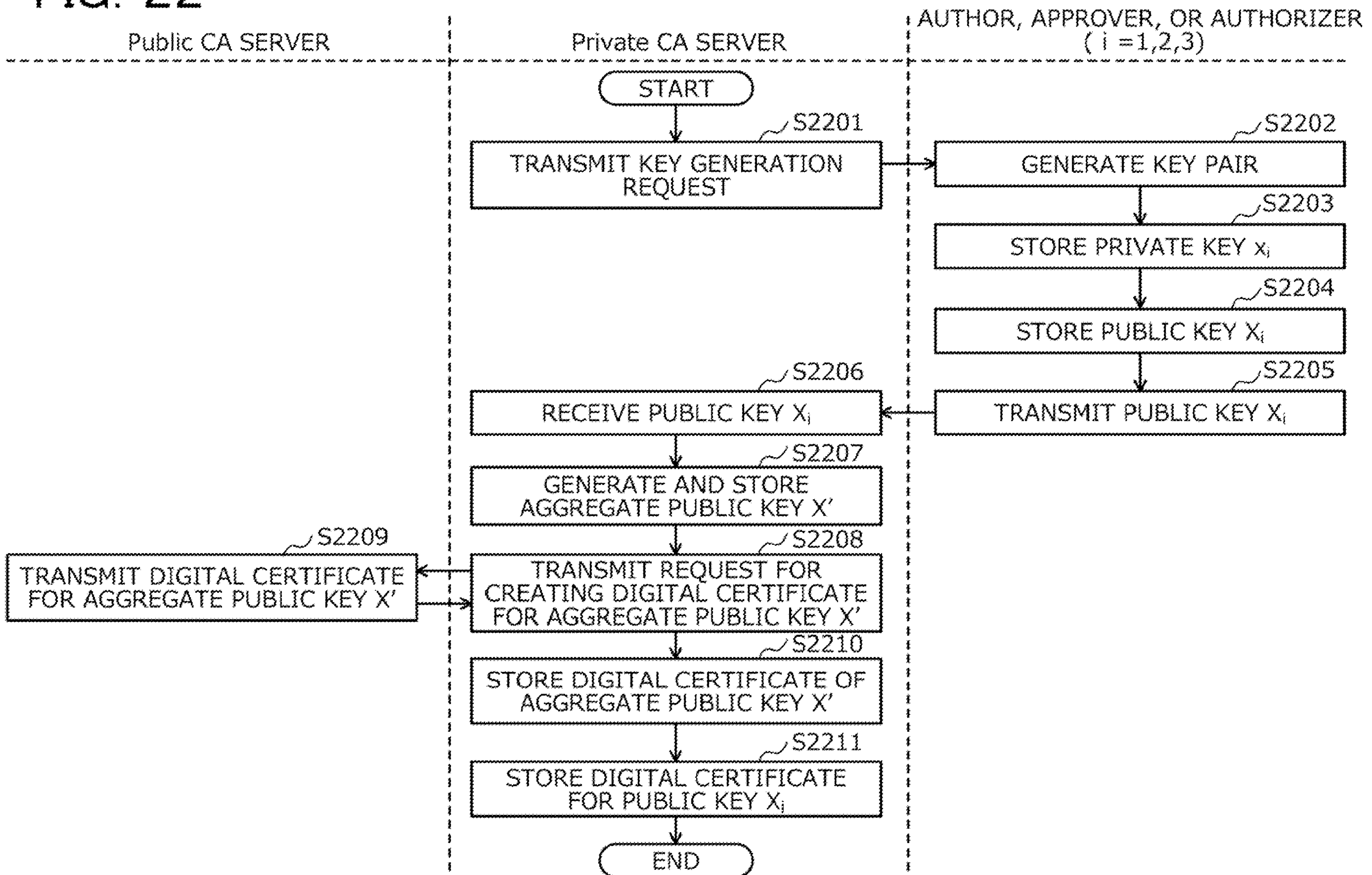
FIG. 22
Public CA SERVER
Private CA SERVER
AUTHOR, APPROVER, OR AUTHORIZER (i =1,2,3)
START
S2201
TRANSMIT KEY GENERATION REQUEST
S2202
GENERATE KEY PAIR
S2203
STORE PRIVATE KEY $x_i$
S2204
STORE PUBLIC KEY $X_i$
S2205
TRANSMIT PUBLIC KEY $X_i$
S2206
RECEIVE PUBLIC KEY $X_i$
S2207
GENERATE AND STORE AGGREGATE PUBLIC KEY X'
S2208
TRANSMIT REQUEST FOR CREATING DIGITAL CERTIFICATE FOR AGGREGATE PUBLIC KEY X'
S2209
TRANSMIT DIGITAL CERTIFICATE FOR AGGREGATE PUBLIC KEY X'
S2210
STORE DIGITAL CERTIFICATE OF AGGREGATE PUBLIC KEY X'
S2211
STORE DIGITAL CERTIFICATE FOR PUBLIC KEY $X_i$
END

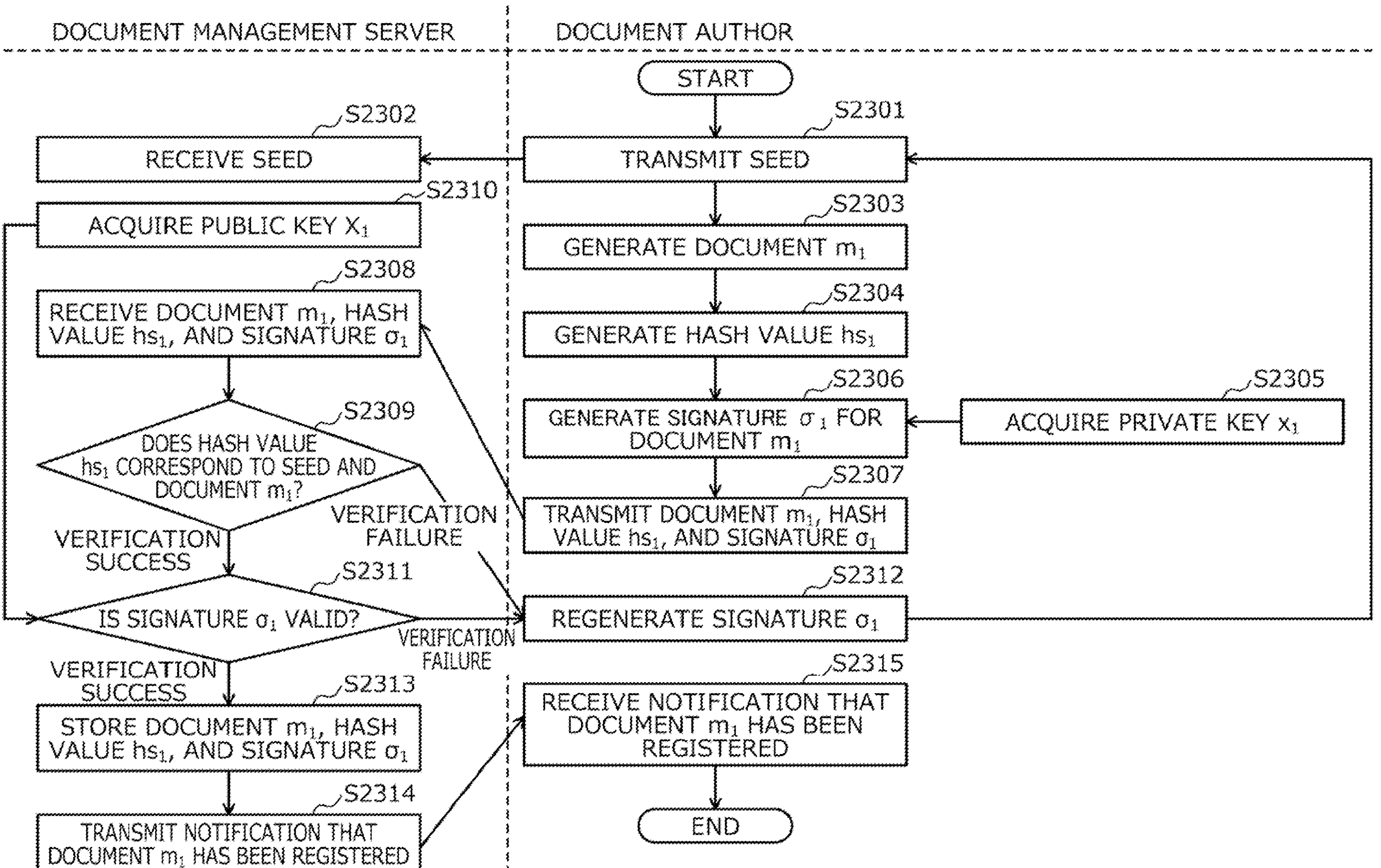
FIG. 23
DOCUMENT MANAGEMENT SERVER
DOCUMENT AUTHOR
START
S2301
TRANSMIT SEED
S2302
RECEIVE SEED
S2310
ACQUIRE PUBLIC KEY $X_1$
S2303
GENERATE DOCUMENT $m_1$
S2304
GENERATE HASH VALUE $hs_1$
S2305
ACQUIRE PRIVATE KEY $x_1$
S2306
GENERATE SIGNATURE $\sigma_1$ FOR DOCUMENT $m_1$
S2307
TRANSMIT DOCUMENT $m_1$, HASH VALUE $hs_1$, AND SIGNATURE $\sigma_1$
S2308
RECEIVE DOCUMENT $m_1$, HASH VALUE $hs_1$, AND SIGNATURE $\sigma_1$
S2309
DOES HASH VALUE $hs_1$ CORRESPOND TO SEED AND DOCUMENT $m_1$?
VERIFICATION FAILURE
VERIFICATION SUCCESS
S2311
IS SIGNATURE $\sigma_1$ VALID?
VERIFICATION FAILURE
VERIFICATION SUCCESS
S2312
REGENERATE SIGNATURE $\sigma_1$
S2313
STORE DOCUMENT $m_1$, HASH VALUE $hs_1$, AND SIGNATURE $\sigma_1$
S2314
TRANSMIT NOTIFICATION THAT DOCUMENT $m_1$ HAS BEEN REGISTERED
S2315
RECEIVE NOTIFICATION THAT DOCUMENT $m_1$ HAS BEEN REGISTERED
END

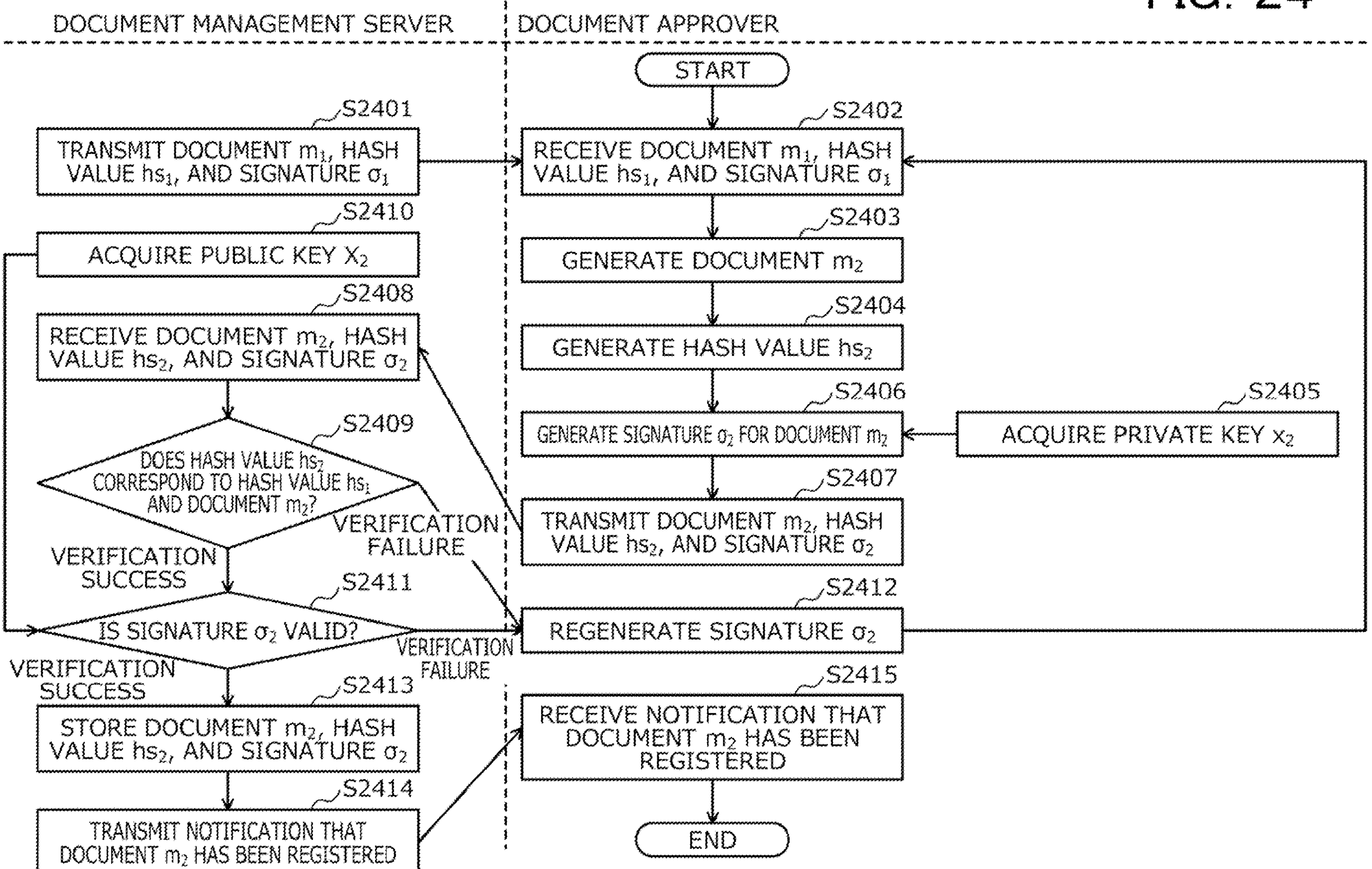
FIG. 24
DOCUMENT MANAGEMENT SERVER
DOCUMENT APPROVER
START
S2401
TRANSMIT DOCUMENT $m_1$, HASH VALUE $hs_1$, AND SIGNATURE $\sigma_1$
S2402
RECEIVE DOCUMENT $m_1$, HASH VALUE $hs_1$, AND SIGNATURE $\sigma_1$
S2403
GENERATE DOCUMENT $m_2$
S2404
GENERATE HASH VALUE $hs_2$
S2405
ACQUIRE PRIVATE KEY $x_2$
S2406
GENERATE SIGNATURE $\sigma_2$ FOR DOCUMENT $m_2$
S2407
TRANSMIT DOCUMENT $m_2$, HASH VALUE $hs_2$, AND SIGNATURE $\sigma_2$
S2410
ACQUIRE PUBLIC KEY $X_2$
S2408
RECEIVE DOCUMENT $m_2$, HASH VALUE $hs_2$, AND SIGNATURE $\sigma_2$
S2409
DOES HASH VALUE $hs_2$ CORRESPOND TO HASH VALUE $hs_1$ AND DOCUMENT $m_2$?
VERIFICATION FAILURE
VERIFICATION SUCCESS
S2411
IS SIGNATURE $\sigma_2$ VALID?
VERIFICATION FAILURE
VERIFICATION SUCCESS
S2412
REGENERATE SIGNATURE $\sigma_2$
S2413
STORE DOCUMENT $m_2$, HASH VALUE $hs_2$, AND SIGNATURE $\sigma_2$
S2414
TRANSMIT NOTIFICATION THAT DOCUMENT $m_2$ HAS BEEN REGISTERED
S2415
RECEIVE NOTIFICATION THAT DOCUMENT $m_2$ HAS BEEN REGISTERED
END

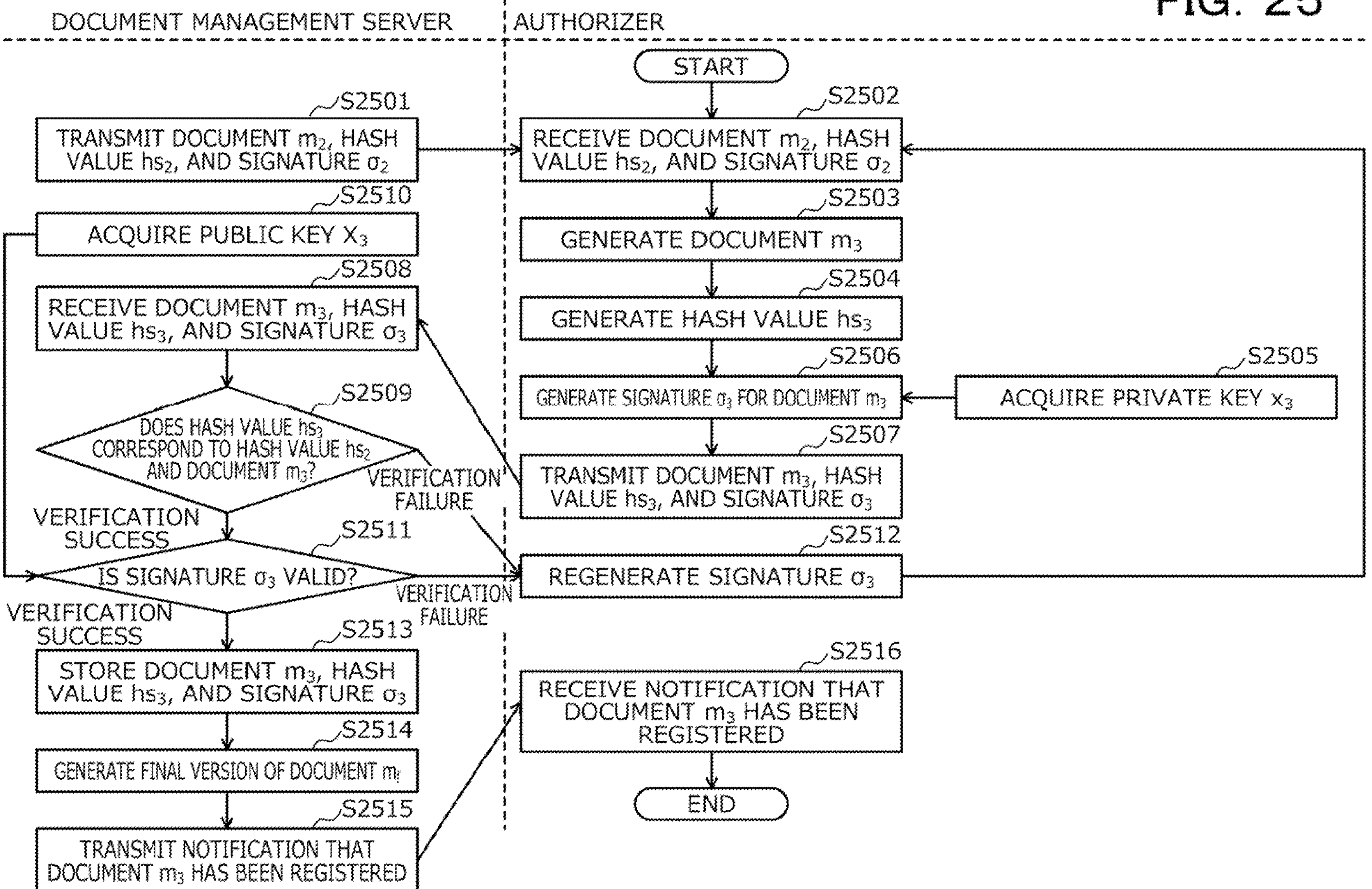
FIG. 25
DOCUMENT MANAGEMENT SERVER
AUTHORIZER
START
S2501
TRANSMIT DOCUMENT $m_2$, HASH VALUE $hs_2$, AND SIGNATURE $\sigma_2$
S2502
RECEIVE DOCUMENT $m_2$, HASH VALUE $hs_2$, AND SIGNATURE $\sigma_2$
S2503
GENERATE DOCUMENT $m_3$
S2504
GENERATE HASH VALUE $hs_3$
S2505
ACQUIRE PRIVATE KEY $x_3$
S2506
GENERATE SIGNATURE $\sigma_3$ FOR DOCUMENT $m_3$
S2507
TRANSMIT DOCUMENT $m_3$, HASH VALUE $hs_3$, AND SIGNATURE $\sigma_3$
S2510
ACQUIRE PUBLIC KEY $X_3$
S2508
RECEIVE DOCUMENT $m_3$, HASH VALUE $hs_3$, AND SIGNATURE $\sigma_3$
S2509
DOES HASH VALUE $hs_3$ CORRESPOND TO HASH VALUE $hs_2$ AND DOCUMENT $m_3$?
VERIFICATION FAILURE
VERIFICATION SUCCESS
S2511
IS SIGNATURE $\sigma_3$ VALID?
VERIFICATION FAILURE
VERIFICATION SUCCESS
S2512
REGENERATE SIGNATURE $\sigma_3$
S2513
STORE DOCUMENT $m_3$, HASH VALUE $hs_3$, AND SIGNATURE $\sigma_3$
S2514
GENERATE FINAL VERSION OF DOCUMENT $m_f$
S2515
TRANSMIT NOTIFICATION THAT DOCUMENT $m_3$ HAS BEEN REGISTERED
S2516
RECEIVE NOTIFICATION THAT DOCUMENT $m_3$ HAS BEEN REGISTERED
END

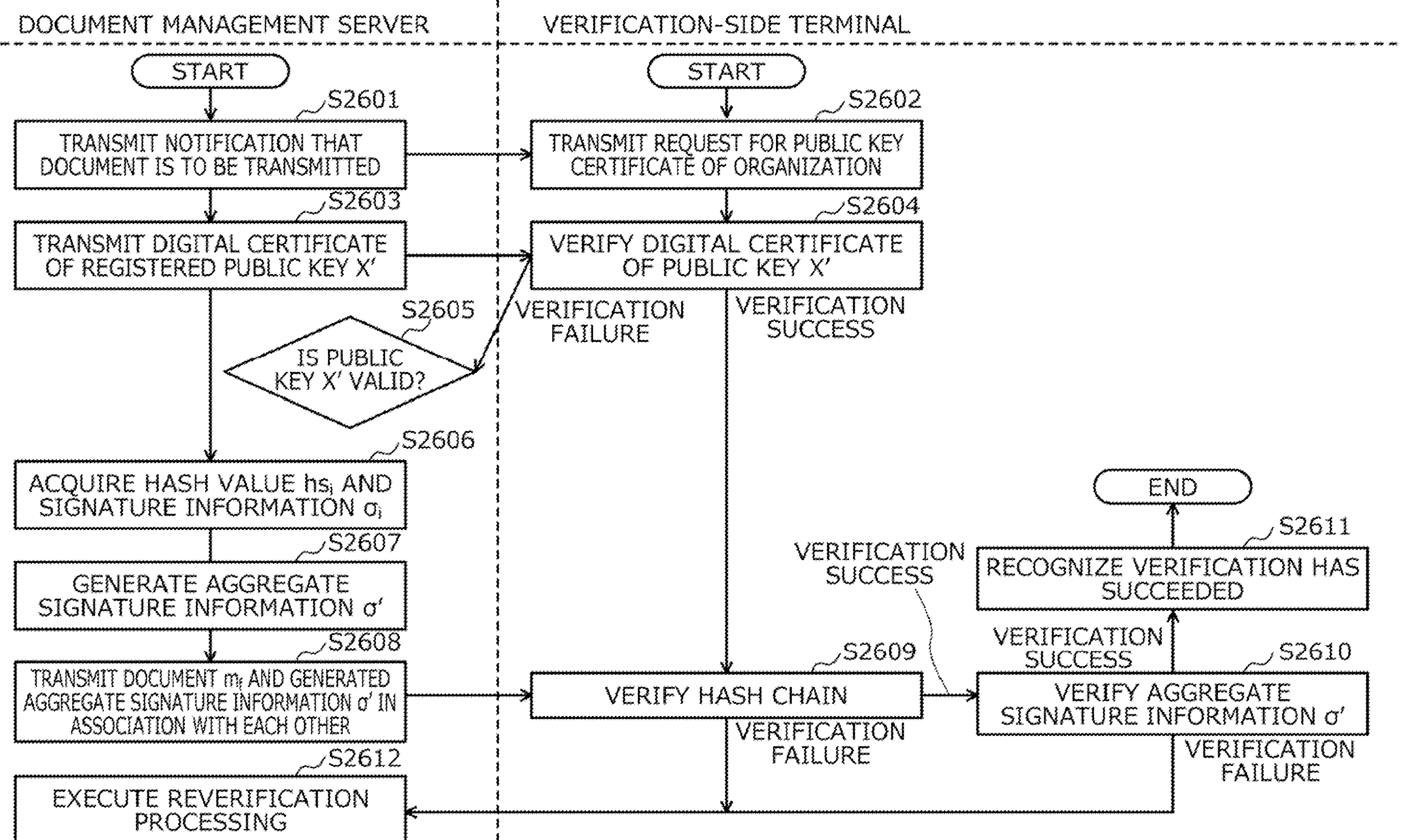
FIG. 26
DOCUMENT MANAGEMENT SERVER
VERIFICATION-SIDE TERMINAL
START
START
S2601
TRANSMIT NOTIFICATION THAT DOCUMENT IS TO BE TRANSMITTED
S2602
TRANSMIT REQUEST FOR PUBLIC KEY CERTIFICATE OF ORGANIZATION
S2603
TRANSMIT DIGITAL CERTIFICATE OF REGISTERED PUBLIC KEY X'
S2604
VERIFY DIGITAL CERTIFICATE OF PUBLIC KEY X'
S2605
IS PUBLIC KEY X' VALID?
VERIFICATION FAILURE
VERIFICATION SUCCESS
S2606
ACQUIRE HASH VALUE $hs_i$ AND SIGNATURE INFORMATION $\sigma_i$
S2607
GENERATE AGGREGATE SIGNATURE INFORMATION $\sigma'$
S2608
TRANSMIT DOCUMENT $m_i$ AND GENERATED AGGREGATE SIGNATURE INFORMATION $\sigma'$ IN ASSOCIATION WITH EACH OTHER
S2609
VERIFY HASH CHAIN
VERIFICATION SUCCESS
VERIFICATION FAILURE
END
S2611
RECOGNIZE VERIFICATION HAS SUCCEEDED
VERIFICATION SUCCESS
S2610
VERIFY AGGREGATE SIGNATURE INFORMATION $\sigma'$
VERIFICATION FAILURE
S2612
EXECUTE REVERIFICATION PROCESSING

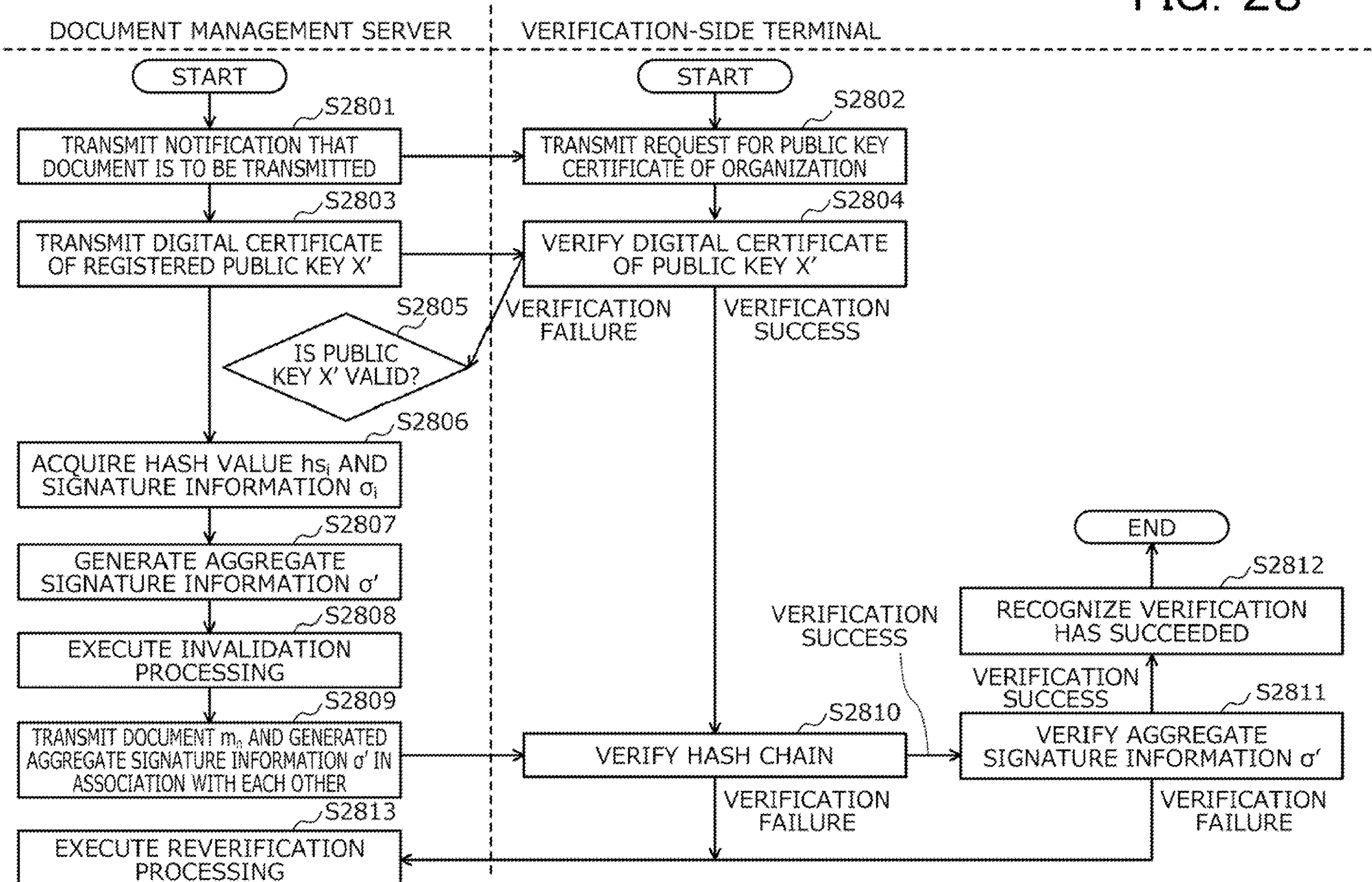
FIG. 28
DOCUMENT MANAGEMENT SERVER
VERIFICATION-SIDE TERMINAL
START
S2801
TRANSMIT NOTIFICATION THAT DOCUMENT IS TO BE TRANSMITTED
START
S2802
TRANSMIT REQUEST FOR PUBLIC KEY CERTIFICATE OF ORGANIZATION
S2803
TRANSMIT DIGITAL CERTIFICATE OF REGISTERED PUBLIC KEY X'
S2804
VERIFY DIGITAL CERTIFICATE OF PUBLIC KEY X'
S2805
IS PUBLIC KEY X' VALID?
VERIFICATION FAILURE
VERIFICATION SUCCESS
S2806
ACQUIRE HASH VALUE $hs_i$ AND SIGNATURE INFORMATION $\sigma_i$
S2807
GENERATE AGGREGATE SIGNATURE INFORMATION σ'
S2808
EXECUTE INVALIDATION PROCESSING
S2809
TRANSMIT DOCUMENT $m_i$ AND GENERATED AGGREGATE SIGNATURE INFORMATION σ' IN ASSOCIATION WITH EACH OTHER
S2810
VERIFY HASH CHAIN
VERIFICATION SUCCESS
VERIFICATION FAILURE
S2811
VERIFY AGGREGATE SIGNATURE INFORMATION σ'
VERIFICATION SUCCESS
VERIFICATION FAILURE
S2812
RECOGNIZE VERIFICATION HAS SUCCEEDED
END
S2813
EXECUTE REVERIFICATION PROCESSING

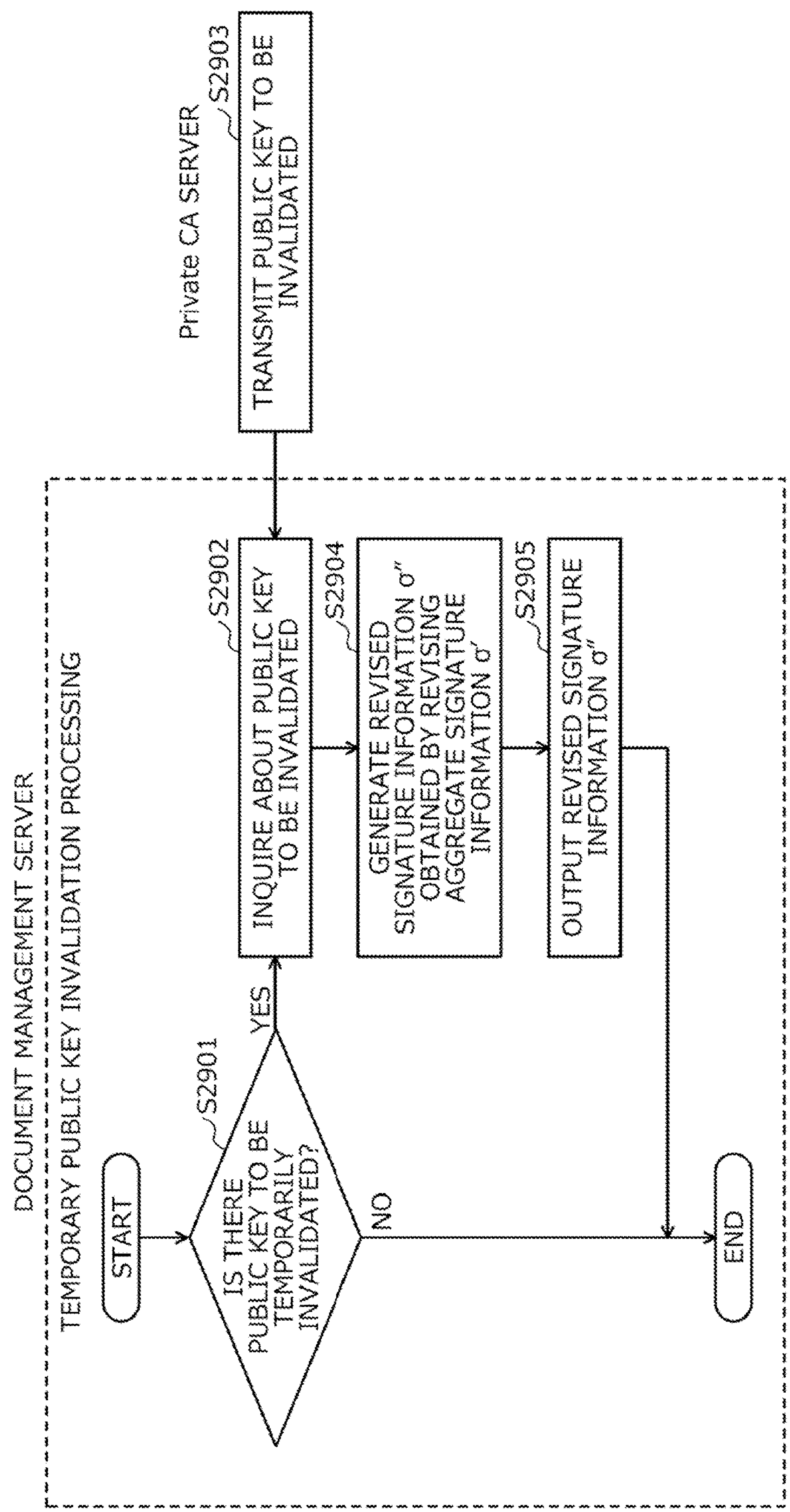
FIG. 29
DOCUMENT MANAGEMENT SERVER
TEMPORARY PUBLIC KEY INVALIDATION PROCESSING
START
S2901
IS THERE PUBLIC KEY TO BE TEMPORARILY INVALIDATED?
YES
NO
S2902
INQUIRE ABOUT PUBLIC KEY TO BE INVALIDATED
S2904
GENERATE REVISED SIGNATURE INFORMATION σ″ OBTAINED BY REVISING AGGREGATE SIGNATURE INFORMATION σ′
S2905
OUTPUT REVISED SIGNATURE INFORMATION σ″
END
Private CA SERVER
S2903
TRANSMIT PUBLIC KEY TO BE INVALIDATED

SIGNATURE CONTROL METHOD, NON-TRANSITORY COMPUTER-READABLE STORAGE MEDIUM FOR STORING SIGNATURE CONTROL PROGRAM, AND INFORMATION PROCESSING DEVICE

CROSS-REFERENCE TO RELATED APPLICATION

This application is a continuation application of International Application PCT/JP2020/025724 filed on Jun. 30, 2020 and designated the U.S., the entire contents of which are incorporated herein by reference.

FIELD

The present invention relates to a signature control method, a non-transitory computer-readable storage medium storing a signature control program, and an information processing device.

BACKGROUND

Conventionally, to prevent falsification of document information, electronic signature information may be added to the document information. Furthermore, there is a technique called an aggregate signature that aggregates a plurality of pieces of signature information added to a plurality of pieces of document information that are different from each other into a single piece of signature information using a plurality of private keys.

As an existing technique, for example, there is a technique of generating a first signature element from a first data portion, generating a first intermediate signature element from the generated first signature element and a second data portion, and generating a second signature element from the generated first intermediate signature element and a first private key.

Examples of the related art include: [Patent Document 1] Japanese Laid-open Patent Publication No. 2013-118706; and [Patent Document 2] Japanese Laid-open Patent Publication No. 2019-212241.

SUMMARY

According to an aspect of the embodiments, there is provided a signature control method implemented by a computer, the signature control method including: acquiring, by a processor circuit of the computer, a plurality of pieces of document information and signature information that corresponds to each piece of document information of the plurality of pieces of document information; generating, by the processor circuit of the computer, aggregate signature information obtained by aggregating the signature information that corresponds to the each piece of document information of the plurality of acquired pieces of document information on a basis of the plurality of acquired pieces of document information; and outputting, by the processor circuit of the computer, the generated aggregate signature information in association with aggregate public key information obtained by aggregating public key information that corresponds to the each piece of document information of the plurality of pieces of document information and the plurality of pieces of document information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram illustrating an example of content stored in a control information management table 400.

FIG. 18 is an explanatory diagram (part 2) illustrating the example of setting the auxiliary parameter d.

FIG. 21 is an explanatory diagram illustrating effects of the signature control system 200.

FIG. 22 is a flowchart illustrating an example of a key generation processing procedure.

FIG. 23 is a flowchart illustrating an example of a document creation processing procedure.

FIG. 24 is a flowchart illustrating an example of a document approval processing procedure.

FIG. 25 is a flowchart illustrating an example of a document authorization processing procedure.

FIG. 26 is a flowchart illustrating an example of a signature aggregation processing procedure.

FIG. 28 is a flowchart illustrating an example of another signature aggregation processing procedure.

FIG. 29 is a flowchart illustrating an example of an invalidation processing procedure.

DESCRIPTION OF EMBODIMENTS

However, the existing technique has a problem of increasing a cost involved in verifying validity of signature information. For example, in the aggregate signature technique, a plurality of public keys corresponding to the plurality of private keys is managed in order to verify the validity of the generated single piece of signature information. Therefore, as the number of public keys increases, the processing cost for verifying the validity of signature information and the management cost for managing the public keys increase.

In one aspect, an object of the present invention is to reduce the cost incurred when verifying the validity of signature information.

Hereinafter, embodiments of a signature control method, a signature control program, and an information processing device according to the present invention will be described in detail with reference to the drawings.

(Example of Signature Control Method According to Embodiment)

Figure 1:
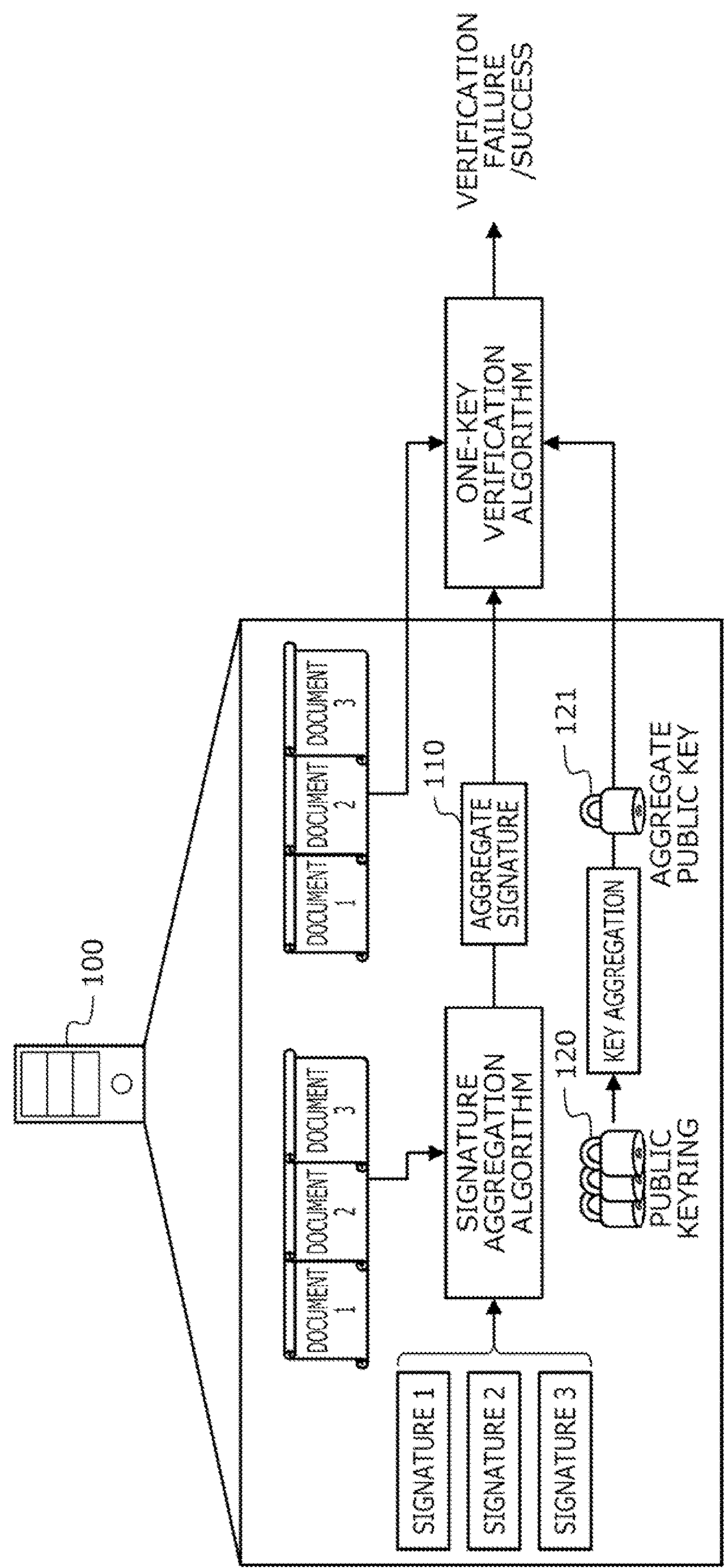
FIG. 1 is an explanatory diagram illustrating an example of a signature control method according to an embodiment.

FIG. 1 is an explanatory diagram illustrating an example of a signature control method according to an embodiment. An information processing device 100 is a computer for generating signature information to be added to document information. The information processing device 100 is a server, a personal computer (PC), or the like.

The signature information is used to prevent falsification of document information, or to certify, confirm, approve content of the document information, or express an intention such as consent to content of the document information. For example, in business, it is conceivable that the signature information representing a corporation is added to a final version of the document information created by the corporation and to be released outside the corporation, and is then released outside the corporation. A verifier outside the corporation verifies the signature information representing the corporation added to the final version of the document information, and attempts to confirm whether the final version of the document information has not been falsified and is valid. In the EU, signature information called e-Seal tends to be used as the signature information representing a corporation.

Specifically, a use case is conceivable in which a plurality of approvers adds personal signature information to the document information while revising the document information, and a server adds signature information representing the corporation to the final version of the document information after the document information becomes the final version, according to an approval flow within the corporation. In such a use case, the server adds the signature information representing the corporation to the document information only in a case where all pieces of the signature information added to the document information by the respective approvers before the document information becomes the final version are valid.

However, in such a use case, the signature information representing the corporation may be mistakenly added to invalid document information. The invalid document information is, for example, document information created by an attacker against the corporation, document information that has been falsified, or document information that violates the approval flow and has not been approved by at least one of the approvers.

For example, in such a use case, there may be case where the signature information representing the corporation is added to the invalid document information as a result of cracking the server that adds the signature information representing the corporation to the final version of the document information. In this case, the verifier outside the corporation will mistakenly determine that the invalid document information is valid document information on the basis of the signature information representing the corporation. Furthermore, in this case, the verifier outside the corporation cannot verify the process of a plurality of approvers approving the document information and adding the personal signature information to the document information according to the approval flow, and it is difficult to verify whether the document information is valid.

Here, regarding a risk that the signature information representing a corporation is mistakenly added to invalid document information, specifically, the content described in the following Non-Patent Document 1 disclosed by the Ministry of Internal Affairs and Communications of Japan can be referred to.

Non-Patent Document 1: Akira Nishiyama, "Use Cases and Issues of e-Seal in Japan", [online], Mar. 19, 2019, Japan Trust Service Forum, [searched on Jun. 26, 2020], Internet <URL: https://www.soumu.go.jp/main_content/000607659.pdf>

For this reason, it is desirable to enable verification of the process of a plurality of approvers adding the personal signature information to the document information, and enable correct addition of the signature information representing a corporation only to the valid document information, according to the approval flow. In other words, it is desirable to avoid the risk of mistakenly add the signature information representing the corporation to the invalid document information.

Meanwhile, there is a technique called aggregate signature. The aggregate signature is a technique of aggregating a plurality of pieces of signature information added to a plurality of pieces of document information that are different from each other into a single piece of signature information using a plurality of pieces of private key information, for example. Here, aggregate signature implementation methods include, for example, a BLS signature-based implementation method, a lattice cryptography-based implementation method, and the like.

Applying this aggregate signature to the above-described use case, a method of aggregating the pieces of signature information respectively added by the plurality of approvers to different versions of the document information into a single piece of signature information, and adding the single piece of the signature information to the final version of the document information, is conceivable. According to this method, it is conceivable that the verifier outside the corporation can verify the process of the plurality of approvers adding the personal signature information to the document information according to the approval flow, by verifying the single piece of the signature information on the basis of a plurality of pieces of public key information corresponding to the plurality of pieces of private key information. Mathematically, verifying a single piece of signature information is equivalent to verifying a plurality of pieces of signature information that are aggregation sources.

Meanwhile, in this method, the plurality of pieces of public key information corresponding to the plurality of pieces of private key information is registered in a public storage device in a referable manner by the verifier outside the corporation. Here, if the number of approvers increases, the number of pieces of public key information registered in the storage device also increases. For this reason, an increase in management cost when managing the public key information is incurred. Furthermore, an increase in processing cost when verifying the single piece of signature information is incurred.

Therefore, in the present embodiment, a signature control method capable of reducing the management cost and processing cost incurred when verifying validity of the signature information by reducing the number of pieces of public key information to be used when verifying the validity of the signature information will be described.

In FIG. 1, the information processing device 100 has a signature aggregation algorithm. The signature aggregation algorithm defines a method of generating one piece of aggregate signature information obtained by aggregating a plurality of pieces of signature information. The information processing device 100 has a key aggregation algorithm. The key aggregation algorithm defines a method of generating one piece of aggregate public key information obtained by aggregating a plurality of pieces of public key information.

(1-1) The information processing device 100 acquires a plurality of pieces of document information and signature information corresponding to each document information of the plurality of pieces of document information. The document information is, for example, document information such as a contract or a source code that is revised by a plurality of people. In the example of FIG. 1, the information processing device 100 acquires documents 1 to 3 and signatures 1 to 3 corresponding to the documents 1 to 3.

(1-2) The information processing device 100 generates aggregate signature information obtained by aggregating the signature information corresponding to each document information of the plurality of acquired pieces of document information on the basis of the plurality of acquired pieces of document information. In the example of FIG. 1, the information processing device 100 generates aggregate signature information 110 obtained by aggregating the signatures 1 to 3 corresponding to the documents 1 to 3 on the basis of the documents 1 to 3 according to the signature aggregation algorithm.

(1-3) The information processing device 100 generates aggregate public key information obtained by aggregating the public key information corresponding to each document information of the plurality of acquired pieces of document information on the basis of the public key information corresponding to each document information. In the example of FIG. 1, the information processing device 100 generates aggregate public key information 121 obtained by aggregating public keyrings 120 on the basis of the public keyrings 120 according to the key aggregation algorithm.

(1-4) The information processing device 100 outputs the generated aggregate signature information in association with the generated aggregate public key information and the plurality of pieces of document information. The information processing device 100 outputs the aggregate signature information such that a corresponding relationship between the aggregate public key information and the plurality of pieces of document information is specifiable. Associating the aggregate signature information with the plurality of pieces of document information means, for example, associating the aggregate signature information with the final version of the document information and hash values of the document information other than the final version.

In the example of FIG. 1, the information processing device 100 outputs the generated aggregate signature information 110 and the generated aggregate public key information 121 in association with the documents 1 to 3. Specifically, the information processing device 100 outputs the generated aggregate signature information 110 and the generated aggregate public key information 121 in association with the documents 1 to 3 in a referable manner by another computer. The another computer is, for example, a computer corresponding to a verifier.

Therefore, the information processing device 100 can reduce the number of pieces of public key information referred to by the computer corresponding to the verifier, and reduce the management cost incurred when managing the public key information and the processing cost incurred when using the public key information. Furthermore, the information processing device 100 enables the verifier to verify the process of generating the plurality of pieces of signature information, which are aggregation sources of the aggregate signature information, on the basis of the aggregate signature information. Therefore, the information processing device 100 can prevent a situation in which the verifier mistakenly determines that the invalid document information is valid document information.

(1-5) The another computer has a one-key verification algorithm. The another computer receives the aggregate signature information and the aggregate public key information associated with the plurality of pieces of document information. The another computer receives the aggregate signature information and the aggregate public key information associated with the plurality of pieces of document information from the information processing device 100, for example.

(1-6) The another computer verifies validity of the received aggregate signature information on the basis of the plurality of pieces of document information, the received aggregate signature information, and the received aggregate public key information. The another computer acquires, for example, a hash value corresponding to each document information of the plurality of pieces of document information. Then, the another computer verifies validity of the received aggregate signature information on the basis of the acquired hash values, the received aggregate signature information, and the received aggregate public key information, according to the one-key verification algorithm.

Therefore, the another computer can verify the process of generating the plurality of pieces of signature information, which are aggregation sources of the aggregate signature information, on the basis of the aggregate signature information. Therefore, the another computer can avoid the situation of mistakenly determining that the invalid document information is valid document information.

Here, a case where the information processing device 100 generates the aggregate public key information obtained by aggregating the public key information corresponding to each piece of document information has been described, but the present embodiment is not limited to this case. For example, apart from the information processing device 100, there may be a case of a generation device that generates the aggregate public key information obtained by aggregating the public key information corresponding to each piece of document information. In this case, the generation device provides the verifier with the aggregate public key information. The information processing device 100 provides the verifier with the generated aggregate signature information such that correspondence of the aggregate public key information with the generated aggregate signature information is specifiable.

(Example of Signature Control System 200)

Next, one example of a signature control system 200 to which the information processing device 100 illustrated in FIG. 1 is applied will be described with reference to FIG. 2.

Figure 2:
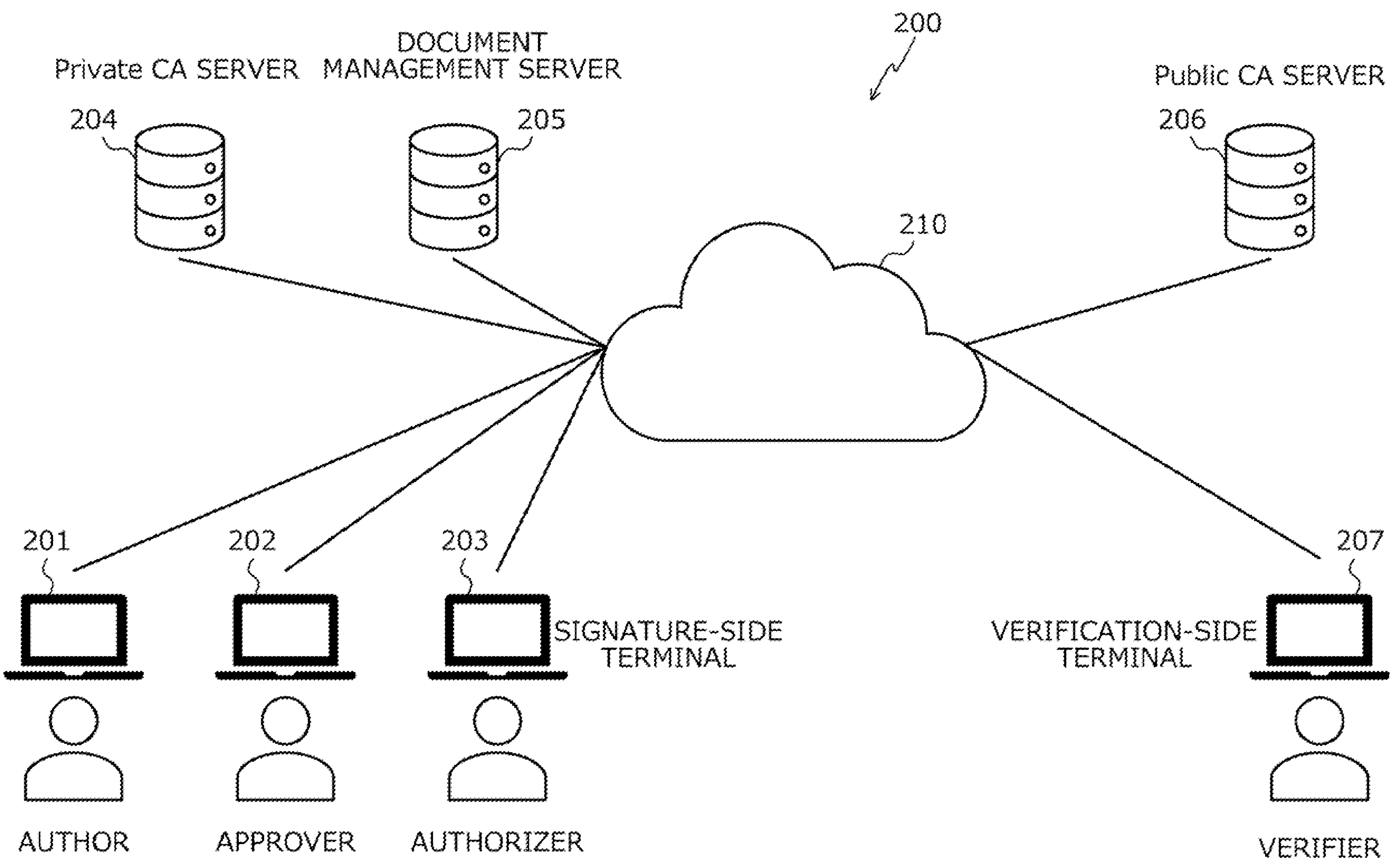
FIG. 2 is an explanatory diagram illustrating an example of a signature control system 200.

FIG. 2 is an explanatory diagram illustrating an example of the signature control system 200. In FIG. 2, the signature control system 200 includes a signature-side terminal 201 corresponding to an author, a signature-side terminal 202 corresponding to an approver, a signature-side terminal 203 corresponding to an authorizer, a private CA server 204, a document management server 205. Moreover, the signature control system 200 includes a public CA server 206 and a verification-side terminal 207 corresponding to the verifier.

In the signature control system 200, each of the signature-side terminals 201 to 203 and the private CA server 204 are connected to each other via a wired or wireless network 210. The network 210 is, for example, a local area network (LAN), a wide area network (WAN), or the Internet.

Furthermore, in the signature control system 200, each of the signature-side terminals 201 to 203 and the document management server 205 are connected to each other via the wired or wireless network 210. Furthermore, in the signature control system 200, the private CA server 204 and the public CA server 206 are connected to each other via the wired or wireless network 210.

Furthermore, in the signature control system 200, the document management server 205 and the verification-side terminal 207 are connected to each other via the wired or wireless network 210. Furthermore, in the signature control system 200, the public CA server 206 and the verification-side terminal 207 are connected to each other via the wired or wireless network 210.

The signature-side terminal 201 is a computer used by the author who creates document information. The signature-side terminal 201 generates new document information on the basis of an operational input of the author. The signature-side terminal 201 generates a key information pair of private key information and public key information. The signature-side terminal 201 generates signature information to be added to the generated new document information on the basis of the private key information of the generated key information pair. The signature-side terminal 201 associates the generated new document information with the generated signature information and transmits the information to the document management server 205. The signature-side terminal 201 transmits the public key information of the generated key information pair to the private CA server 204. The signature-side terminal 201 is, for example, a server, a PC, a tablet terminal, or a smartphone.

The signature-side terminal 202 is a computer used by the approver who approves document information. The signature-side terminal 202 acquires the document information to which the signature information is added from the document management server 205 on the basis of an operation input of the approver. The signature-side terminal 202 revises the acquired document information and generates new document information on the basis of the operation input of the approver. The signature-side terminal 202 generates a key information pair of private key information and public key information. The signature-side terminal 202 generates signature information to be added to the generated new document information on the basis of the private key information of the generated key information pair. The signature-side terminal 202 associates the generated new document information with the generated signature information and transmits the information to the document management server 205. The signature-side terminal 202 transmits the public key information of the generated key information pair to the private CA server 204. The signature-side terminal 202 is, for example, a server, a PC, a tablet terminal, or a smartphone.

The signature-side terminal 203 is a computer used by the authorizer who authorizes document information. The signature-side terminal 203 acquires the document information to which the signature information is added from the document management server 205 on the basis of an operation input of the authorizer. The signature-side terminal 203 revises the acquired document information and generates new document information on the basis of the operation input of the authorizer. The signature-side terminal 203 generates a key information pair of private key information and public key information. The signature-side terminal 203 generates signature information to be added to the generated new document information on the basis of the private key information of the generated key information pair. The signature-side terminal 203 associates the generated new document information with the generated signature information and transmits the information to the document management server 205. The signature-side terminal 203 transmits the public key information of the generated key information pair to the private CA server 204. The signature-side terminal 203 is, for example, a server, a PC, a tablet terminal, or a smartphone.

The private CA server 204 is a computer that manages the public key information. The private CA server 204 has a function as the information processing device 100 illustrated in FIG. 1. The private CA server 204 generates aggregate public key information obtained by aggregating a plurality of pieces of public key information. The private CA server 204 transmits the generated aggregate public key information to the public CA server 206. The private CA server 204 is, for example, a server, a PC, or the like.

The document management server 205 is a computer that manages signature information associated with document information. The document management server 205 has functions as the information processing device 100 illustrated in FIG. 1. The document management server 205 generates aggregate signature information obtained by aggregating a plurality of pieces of signature information. The document management server 205 stores the generated aggregate signature information in a control information management table 400 to be described below in FIG. 4. The document management server 205 transmits the generated aggregate signature information to the verification-side terminal 207. The document management server 205 is, for example, a server, a PC, or the like.

The public CA server 206 is a computer that manages the aggregate public key information. The public CA server 206 receives the aggregate public key information from the private CA server 204. The public CA server 206 transmits the received aggregate public key information to the verification-side terminal 207. The public CA server 206 is, for example, a server, a PC, or the like.

The verification-side terminal 207 is a computer used by the verifier. The verification-side terminal 207 receives the aggregate signature information from the document management server 205. The verification-side terminal 207 receives the aggregate public key information from the public CA server 206. The verification-side terminal 207 verifies whether the received aggregate signature information is valid or not on the basis of the received aggregate public key information. The verification-side terminal 207 is, for example, a server, a PC, or the like.

Here, a case where the signature control system 200 includes one signature-side terminal 202 corresponding to the approver has been described, but the present embodiment is not limited to the case. For example, there may be a case where the signature control system 200 includes a plurality of signature-side terminals 202 corresponding to approvers. Here, a case where the private CA server 204 and the document management server 205 are different devices has been described, but the present embodiment is not limited to the case. For example, there may be a case where the private CA server 204 and the document management server 205 are integrated.

(Hardware Configuration Example of Information Processing Device 100)

Next, a hardware configuration example of the information processing device 100 applied to the private CA server 204 and the document management server 205 will be described with reference to FIG. 3.

Figure 3:
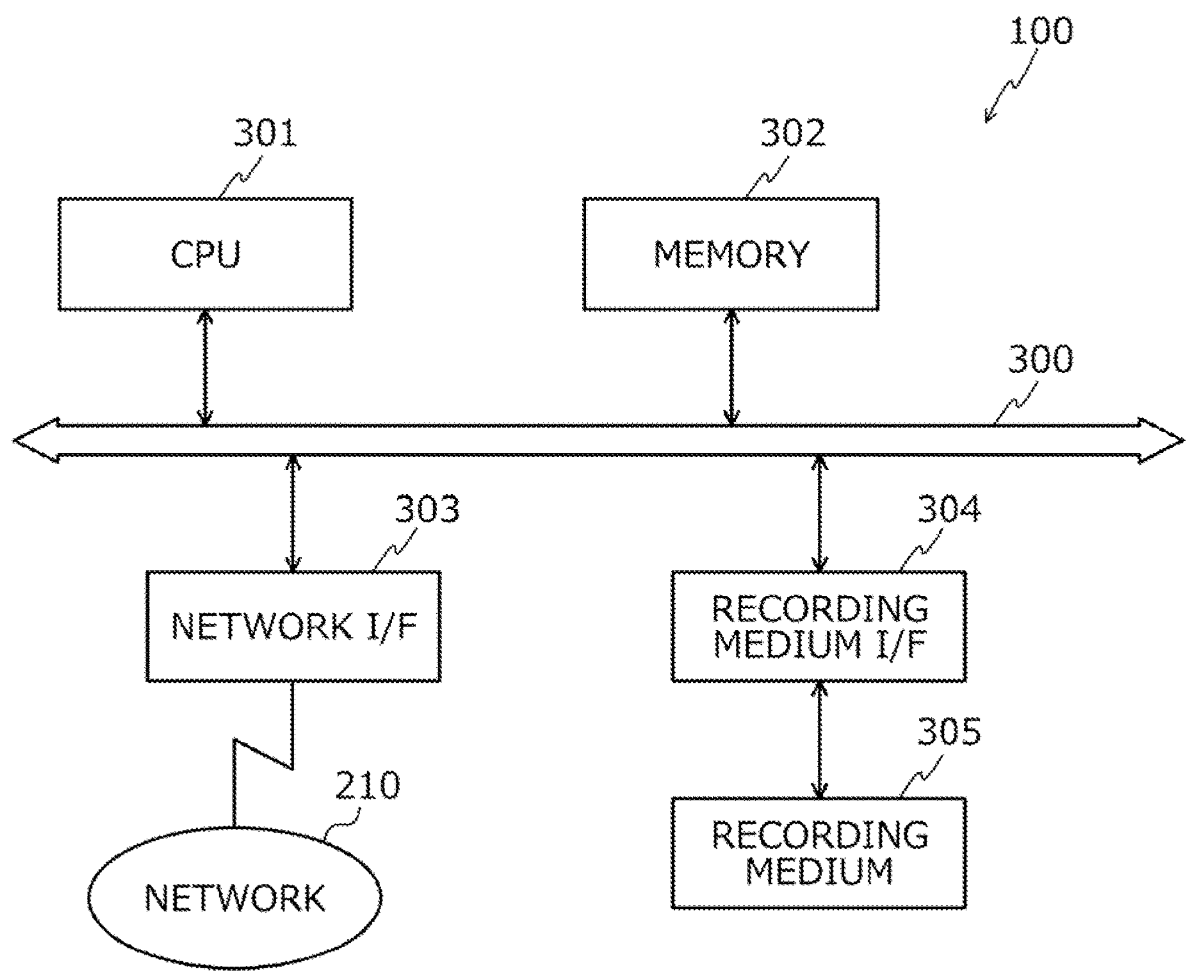
FIG. 3 is a block diagram illustrating a hardware configuration example of an information processing device 100.

FIG. 3 is a block diagram illustrating a hardware configuration example of the information processing device 100. In FIG. 3, the information processing device 100 includes a central processing unit (CPU) 301, a memory 302, a network interface (I/F) 303, a recording medium I/F 304, and a recording medium 305. Furthermore, the individual configuration units are connected to each other by a bus 300.

Here, the CPU 301 is responsible for overall control of the information processing device 100. For example, the memory 302 includes, for example, a read only memory (ROM), a random access memory (RAM), a flash ROM, and the like. Specifically, for example, the flash ROM or the ROM stores various programs, and the RAM is used as a work area for the CPU 301. The programs stored in the memory 302 are loaded into the CPU 301 to cause the CPU 301 to execute coded processing.

The network I/F 303 is connected to the network 210 through a communication line, and is connected to another computer via the network 210. Then, the network I/F 303 manages an interface between the network 210 and the inside, and controls input and output of data from another computer. The network I/F 303 is, for example, a modem or a LAN adapter.

The recording medium I/F 304 controls reading and writing of data from and to the recording medium 305 under the control of the CPU 301. The recording medium I/F 304 is, for example, a disk drive, a solid state drive (SSD), a universal serial bus (USB) port or the like. The recording medium 305 is a nonvolatile memory that stores data written under the control of the recording medium I/F 304. For example, the recording medium 305 is a disk, a semiconductor memory, a USB memory, or the like. The recording medium 305 may be attachable to and detachable from the information processing device 100.

The information processing device 100 may include, for example, a keyboard, a mouse, a display, a printer, a scanner, a microphone, or a speaker, in addition to the above-described configuration units. Furthermore, the information processing device 100 may include a plurality of the recording medium I/Fs 304 and recording media 305. Furthermore, the information processing device 100 does not have to include the recording medium I/F 304 or the recording medium 305.

(Stored Content in Control Information Management Table 400)

Next, an example of content stored in the control information management table 400 will be described with reference to FIG. 4. The control information management table 400 is implemented by a storage area such as the memory 302 or the recording medium 305 of the information processing device 100 illustrated in FIG. 3, for example.

FIG. 4 is an explanatory diagram illustrating an example of content stored in the control information management table 400. As illustrated in FIG. 4, the control information management table 400 has fields for signer, document information, signature target, private key, public key, and signature information. The control information management table 400 stores control information as a record 400-*a* by setting information in each field for each signer. The letter a is an arbitrary integer.

Identification information for identifying the signer who adds the signature information to the document information is set in the signer field. The signer includes, for example, a corporation. The document information to which the signature information is added is set in the document information field. The document information may include approval flow information indicating a person responsible for the document or the authorizer. The person responsible for the document is, for example, the author or the approver. The approval flow information makes it possible to specify that the validity of the aggregate signature information added to the document information is verifiable on the basis of the aggregate public key information obtained by aggregating which public key information. A hash value corresponding to the document information is set in the signature target field. The private key information used when generating the signature information is set in the private key field. The public key information corresponding to the private key information is set in the public key field. The signature information added to the document information is set in the signature information field.

(Hardware Configuration Example of Verification-Side Terminal 207)

Next, a hardware configuration example of the verification-side terminal 207 will be described with reference to FIG. 5.

Figure 5:
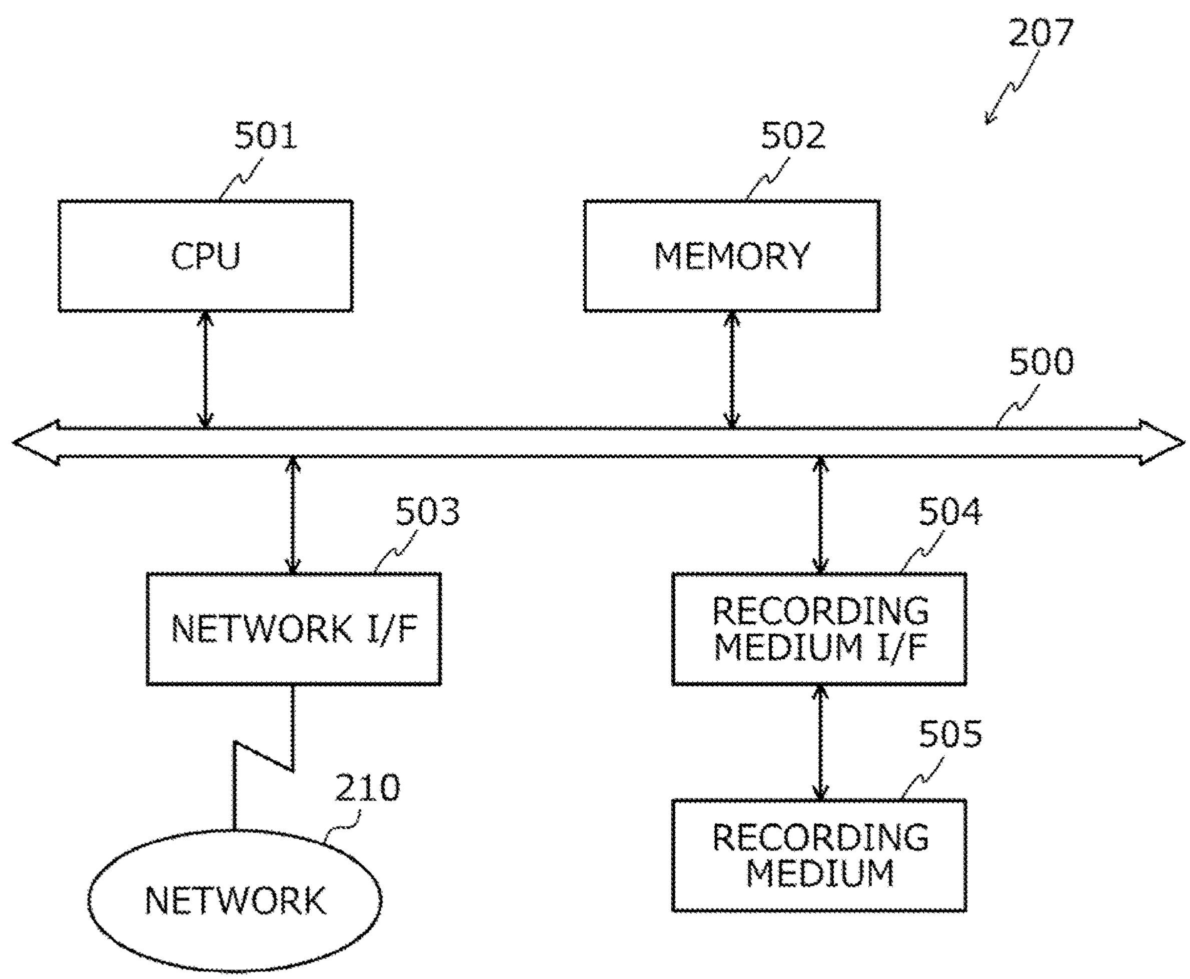
FIG. 5 is a block diagram illustrating a hardware configuration example of a verification-side terminal 207.

FIG. 5 is a block diagram illustrating a hardware configuration example of the verification-side terminal 207. In FIG. 5, the verification-side terminal 207 includes a CPU 501, a memory 502, a network I/F 503, a recording medium I/F 504, and a recording medium 505. Furthermore, the configuration units are connected to each other via a bus 500.

Here, the CPU 501 performs overall control of the verification-side terminal 207. The memory 502 includes, for example, a ROM, a RAM, a flash ROM, or the like. Specifically, for example, the flash ROM or the ROM stores various programs, while the RAM is used as a work area for the CPU 501. The programs stored in the memory 502 are loaded into the CPU 501 to cause the CPU 501 to execute coded processing.

The network I/F 503 is connected to the network 210 through a communication line, and is connected to another computer through the network 210. Then, the network I/F 503 manages an interface between the network 210 and the inside, and controls input and output of data to and from the another computer. The network I/F 503 is, for example, a modem, a LAN adapter, or the like.

The recording medium I/F 504 controls reading and writing of data from and to the recording medium 505 under the control of the CPU 501. The recording medium I/F 504 is, for example, a disk drive, an SSD, a USB port, or the like. The recording medium 505 is a nonvolatile memory that stores data written under the control of the recording medium I/F 504. The recording medium 505 is, for example, a disk, a semiconductor memory, a USB memory, or the like. The recording medium 505 may be attachable to and detachable from the verification-side terminal 207.

The verification-side terminal 207 may include, for example, a keyboard, a mouse, a display, a printer, a scanner, a microphone, or a speaker, in addition to the configuration units described above. Furthermore, the verification-side terminal 207 may include a plurality of the recording medium I/Fs 504 or a plurality of the recording media 505. Furthermore, the verification-side terminal 207 does not have to include the recording medium I/F 504 and the recording medium 505.

(Functional Configuration Example of Signature Control System 200)

Next, a functional configuration example of the signature control system 200 will be described with reference to FIG. 6.

Figure 6:
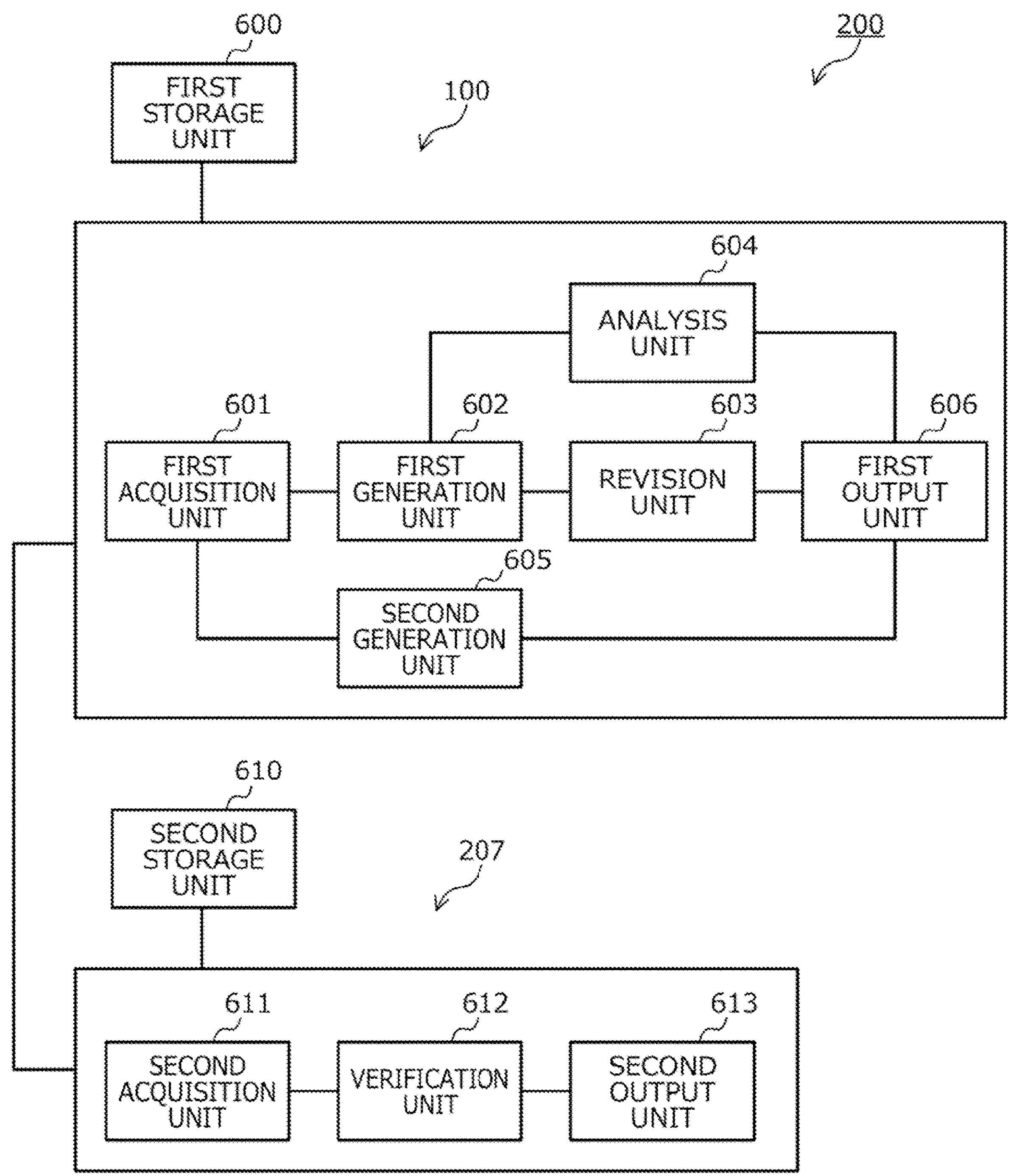
FIG. 6 is a block diagram illustrating a functional configuration example of the signature control system 200.

FIG. 6 is a block diagram illustrating a functional configuration example of the signature control system 200. In the signature control system 200, the information processing device 100 includes a first storage unit 600, a first acquisition unit 601, a first generation unit 602, a revision unit 603, an analysis unit 604, a second generation unit 605, and a first output unit 606.

The first storage unit 600 is implemented by a storage area of the memory 302, the recording medium 305, or the like illustrated in FIG. 3, for example. Hereinafter, a case where the first storage unit 600 is included in the information processing device 100 will be described. However, the embodiment is not limited to the case. For example, the first storage unit 600 may be included in a device different from the information processing device 100, and content stored in the first storage unit 600 may be able to be referred to by the information processing device 100.

The first acquisition unit 601 to the first output unit 606 function as an example of a control unit of the information processing device 100. Specifically, for example, the first acquisition unit 601 to the first output unit 606 implement functions thereof by causing the CPU 301 to execute a program stored in the storage area such as the memory 302, the recording medium 305, or the like or by the network I/F 303 illustrated in FIG. 3. A processing result of each functional unit is stored in, for example, a storage area such as the memory 302 or the recording medium 305 illustrated in FIG. 3.

The first storage unit 600 stores various types of information to be referred to or updated in the processing of each functional unit. The first storage unit 600 stores a plurality of pieces of document information. The document information is, for example, document information such as a contract or a source code that is revised by a plurality of people. The plurality of pieces of document information includes, for example, pieces of document information indicating respective versions of a plurality of versions of a first document.

The first storage unit 600 stores a key pair for each signer. The key pair includes the private key information and the public key information. The signer includes, for example, a corporation. The first storage unit 600 stores the key pair for each predetermined signer according to a predetermined approval flow. The public key information of the key pair stored in the first storage unit 600 may include public key information that does not correspond to any document information stored in the first storage unit 600.

The first storage unit 600 stores the signature information added to the document information in association with the document information. The first storage unit 600 stores the document information, the public key information, and the signature information in association with each other, for example, for each predetermined signer. Specifically, the first storage unit 600 stores the control information management table 400 illustrated in FIG. 4.

The first acquisition unit 601 acquires various types of information to be used for the processing of each functional unit. The first acquisition unit 601 stores the acquired various types of information in the first storage unit 600 or outputs the acquired various types of information to each functional unit. Furthermore, the first acquisition unit 601 may output the various types of information stored in the first storage unit 600 to each functional unit. The first acquisition unit 601 acquires the various types of information on the basis of, for example, an operation input from the user. The first acquisition unit 601 may receive the various types of information from a device different from the information processing device 100, for example.

The first acquisition unit 601 acquires a plurality of pieces of document information and signature information corresponding to each piece of document information of the plurality of pieces of document information. The first acquisition unit 601 collects, for example, the document information and the signature information corresponding to the document information from each of the signature-side terminals 201 to 203, thereby obtaining the plurality of pieces of document information and the signature information corresponding to each piece of document information of the plurality of pieces of document information. For example, the first acquisition unit 601 may acquire the plurality of pieces of document information and the signature information corresponding to each piece of document information of the plurality of pieces of document information on the basis of an operation input from the user.

The first acquisition unit 601 may receive a start trigger to start processing of any one of the functional units. The start trigger is, for example, predetermined operation input made by the user. The start trigger may be, for example, reception of predetermined information from another computer. The start trigger may be, for example, output of predetermined information by any one of the functional units. The first acquisition unit 601 may receive, for example, acquisition of the plurality of pieces of document information and the signature information corresponding to each piece of document information of the plurality of pieces of document information, as the start trigger for starting the processing of the first generation unit 602 to the second generation unit 605.

The first generation unit 602 generates aggregate signature information obtained by aggregating the signature information corresponding to each piece of document information of the plurality of acquired pieces of document information on the basis of the plurality of acquired pieces of document information.

The first generation unit 602 generates the aggregate signature information on the basis of the hash value corresponding to each piece of document information of the plurality of acquired pieces of document information. The first generation unit 602 uses, for example, a Schnorr signature algorithm. The validity of the aggregate signature information generated by the first generation unit 602 is verifiable on the basis of the plurality of acquired pieces of document information, the aggregate signature information generated by the first generation unit 602, and the aggregate public key information generated by the second generation unit 605. Therefore, the first generation unit 602 can obtain the aggregate signature information that enables the verifier to verify the validity of the document information.

The first generation unit 602 generates the aggregate signature information on the basis of a safe prime and the hash value corresponding to each piece of document information of the plurality of acquired pieces of document information. The first generation unit 602 sets parameters on the basis of, for example, the safe prime and the hash value corresponding to each piece of document information of the plurality of acquired pieces of document information. Then, the first generation unit 602 generates the aggregate signature information on the basis of the set parameters. Therefore, the first generation unit 602 can reduce a processing amount incurred when generating the aggregate signature information.

The first generation unit 602 generates a check hash value on the basis of a hash chain formed from a seed and the hash value corresponding to each version of the first document. Therefore, the first generation unit 602 can obtain the check hash value that enables the verifier to verify the validity of the document information with higher accuracy.

The second generation unit 605 generates the aggregate public key information obtained by aggregating the public key information corresponding to each piece of document information of the plurality of acquired pieces of document information on the basis of the public key information corresponding to the each piece of document information. The public key information corresponding to the document information is public key information corresponding to the private key information used when generating the signature information corresponding to the document information. Therefore, the second generation unit 605 can reduce the number of pieces of public key information used when verifying the validity of the aggregate signature information on the verifier side, and can reduce the cost incurred when verifying the validity of the aggregate signature information.

The second generation unit 605 generates aggregate public key information obtained by aggregating the public key information corresponding to each piece of document information of the plurality of acquired pieces of document information, and public key information not corresponding to any document information of the plurality of acquired pieces of document information. For example, even if the first storage unit 600 stores the public key information not corresponding to any document information, the second generation unit 605 generates the aggregate public key information obtained by aggregating the public key information stored in the first storage unit 600. Therefore, the second generation unit 605 can obtain the aggregate public key information according to a predetermined approval flow.

The revision unit 603 generates revised signature information obtained by revising the generated aggregate signature information on the basis of the public key information not corresponding to any document information. Therefore, the revision unit 603 can obtain the revised signature information verifiable on the basis of the aggregate public key information even if the signature information based on any private key information has not been generated contrary to the predetermined approval flow.

In a case where the aggregate signature information output in association with the plurality of pieces of document information is determined not to be valid, the analysis unit 604 specifies which piece of signature information of the plurality of pieces of signature information, which are aggregation sources, is not valid. The analysis unit 604 verifies, for example, whether each piece of signature information of the plurality of pieces of signature information, which are aggregation sources, is valid or not.

For example, in a case where the aggregate signature information is determined not to be valid, the analysis unit 604 acquires two pieces of aggregate signature information: aggregate signature information obtained by aggregating some pieces of signature information; and aggregate signature information obtained by aggregating pieces of signature information other than the some pieces of signature information, among the pieces of signature information that are aggregation sources of the aggregate signature information. Then, the analysis unit 604 verifies the validity of each of the acquired two pieces of aggregate signature information. Therefore, the analysis unit 604 can specify which piece of signature information of the plurality of pieces of signature information, which are aggregation sources, is not valid, which allows the verifier to know which is not valid.

Moreover, for example, a case where at least one of the acquired two pieces of aggregate signature information is determined not to be valid is conceivable. In this case, for example, the analysis unit 604 newly acquires two pieces of aggregate signature information: aggregate signature information obtained by aggregating some pieces of signature information; and aggregate signature information obtained by aggregating pieces of signature information other than the some pieces of signature information, among the pieces of signature information, which are aggregation sources of any aggregate signature information determined not to be valid. Then, the analysis unit 604 verifies the validity of each of the newly acquired two pieces of aggregate signature information. Therefore, the analysis unit 604 can specify which piece of signature information of the plurality of pieces of signature information, which are aggregation sources, is not valid, which allows the verifier to know which is not valid.

The first output unit 606 outputs a processing result of at least any one of the functional units. An output format is, for example, display on a display, print output to a printer, transmission to an external device by the network I/F 303, or storage in a storage area such as the memory 302 or the recording medium 305. Therefore, the first output unit 606 can notify the user of the processing result of at least one of the functional units.

The first output unit 606 outputs the generated aggregate signature information. The first output unit 606 outputs, to the verifier, the generated aggregate signature information together with information that indicates the approval flow, for example, and enables specification of the aggregate public key information in association with the plurality of pieces of document information. Therefore, the first output unit 606 enables the verifier to verify the validity of the document information.

The first output unit 606 outputs the generated aggregate public key information. The first output unit 606 outputs, for example, the generated aggregate public key information to the verifier. Specifically, the first output unit 606 registers the generated aggregate public key information in the public CA server 206 in a referable manner by the verifier. Therefore, the first output unit 606 enables the verifier to verify the validity of the document information.

The first output unit 606 outputs the generated aggregate signature information in association with the generated aggregate public key information and the plurality of pieces of document information. The first output unit 606 outputs, for example, the generated aggregate signature information in association with the generated aggregate public key information and the plurality of acquired pieces of document information to the verifier for the plurality of acquired pieces of document information. The aggregate signature information is associated with the plurality of pieces of document information by, for example, being associated with the final version of the document information of the plurality of pieces of document information and the hash values corresponding to the pieces of document information other than the final version. The aggregate signature information is associated with the aggregate public key information by, for example, information for identifying the person responsible for the document and the authorizer included in the final version of the document information associated with the aggregate signature information. Therefore, the first output unit 606 enables the verifier to verify the validity of the document information.

The first output unit 606 outputs a result of verifying the validity of each of the acquired two pieces of aggregate signature information. The first output unit 606 outputs, for example, the result of verifying the validity of each of the acquired two pieces of aggregate signature information in a referable manner by the user. Therefore, the first output unit 606 enables the user to grasp which signature information is not valid and which approver's approval action is problematic.

The first output unit 606 outputs the generated revised signature information. The first output unit 606 outputs, to the verifier, the generated revised signature information together with information that indicates the approval flow, for example, and enables specification of the aggregate public key information in association with the plurality of pieces of document information. Therefore, the first output unit 606 enables the verifier to verify the validity of the document information.

The first output unit 606 outputs the generated revised signature information in association with the generated aggregate public key information and the plurality of pieces of document information. The first output unit 606 outputs, for example, the generated revised signature information in association with the generated aggregate public key information and the plurality of pieces of document information to the verifier. Therefore, the revision unit 603 enables the verifier to verify the validity of the document information even if the signature information based on any private key information has not been generated contrary to the predetermined approval flow.

The first output unit 606 outputs, for example, the check hash value in association with the aggregate signature information. Therefore, the first output unit 606 enables the verifier to verify the validity of the document information with more accuracy.

In the signature control system 200, the verification-side terminal 207 includes a second storage unit 610, a second acquisition unit 611, a verification unit 612, and a second output unit 613.

The second storage unit 610 is implemented by a storage area of the memory 502, the recording medium 505, or the like illustrated in FIG. 5, for example. Hereinafter, a case where the second storage unit 610 is included in the verification-side terminal 207 will be described below, but the present embodiment is not limited to the case. For example, the second storage unit 610 may be included in a device different from the verification-side terminal 207, and the content stored in the second storage unit 610 may be able to be referred to from the verification-side terminal 207.

The second acquisition unit 611 to the second output unit 613 function as an example of a control unit of the verification-side terminal 207. Specifically, for example, the second acquisition unit 611 to the second output unit 613 implement functions thereof by causing the CPU 501 to execute a program stored in the storage area such as the memory 502, the recording medium 505, or the like or by the network I/F 503 illustrated in FIG. 5. A processing result of each function unit is stored in, for example, the storage area such as the memory 502 or the recording medium 505 illustrated in FIG. 5.

The second storage unit 610 stores various types of information to be referred to or updated in the processing of each functional unit. The second storage unit 610 stores the aggregate signature information obtained by aggregating the signature information corresponding to each piece of document information of the plurality of pieces of document information, and the aggregate public key information obtained by aggregating the public key information corresponding to each piece of document information of the plurality of pieces of document information, associated with the plurality of pieces of document information. The second storage unit 610 stores the aggregate signature information and the aggregate public key information associated with a combination of the final version of the document information of the plurality of pieces of document information, and the hash value corresponding to the document information other than the final version of the plurality of pieces of document information, for example.

The second acquisition unit 611 acquires various types of information to be used for the processing of each functional unit. The second acquisition unit 611 stores the acquired various types of information in the storage unit, or outputs the acquired various types of information to each functional unit. Furthermore, the second acquisition unit 611 may output the various types of information stored in the storage unit to each functional unit. The second acquisition unit 611 acquires the various types of information on the basis of, for example, an operation input from the user. The second acquisition unit 611 may receive the various types of information from, for example, a device different from the verification-side terminal 207.

The second acquisition unit 611 acquires the aggregate signature information and the aggregate public key information associated with the plurality of pieces of document information. The second acquisition unit 611 acquires the aggregate signature information associated with the plurality of pieces of document information from, for example, a device that generates the aggregate signature information. The second acquisition unit 611 acquires the aggregate public key information associated with the plurality of pieces of document information from, for example, a device that generates the aggregate public key information.

The second storage unit 610 acquires, by receiving from the information processing device 100, the aggregate signature information and the aggregate public key information associated with the combination of the final version of the document information and the hash value corresponding to the document information other than the final version, for example. The second storage unit 610 may receive the aggregate signature information and the aggregate public key information associated with the plurality of pieces of document information on the basis of an operation input from the verifier, for example.

The second acquisition unit 611 may receive a start trigger to start processing of any one of the functional units. The start trigger is, for example, predetermined operation input made by the user. The start trigger may be, for example, reception of predetermined information from another computer. The start trigger may be, for example, output of predetermined information by any one of the functional units. The second acquisition unit 611 receives, for example, the acquisition of the aggregate signature information and the aggregate public key information associated with the plurality of pieces of document information as the start trigger to start the processing of the verification unit 612.

The verification unit 612 verifies the validity of the received aggregate signature information on the basis of the plurality of pieces of document information, the received aggregate signature information, and the received aggregate public key information. The verification unit 612 verifies the validity of the received aggregate signature information on the basis of the hash value corresponding to each piece of document information of the plurality of pieces of document information, the received aggregate signature information, and the received aggregate public key information, for example. Therefore, the verification unit 612 can verify the validity of the aggregate signature information, and can verify the validity of the document information.

The second output unit 613 outputs a processing result of at least any one of the functional units. An output format is, for example, display on a display, print output to a printer, transmission to an external device by the network I/F 503, or storage to the storage area such as the memory 502 or the recording medium 505. Therefore, the second output unit 613 can notify the user of the processing result of at least one of the functional units. The second output unit 613 outputs the result verified by the verification unit 612, for example.

Here, a case where the information processing device 100 does not have the verification unit 612 has been described, but the present embodiment is not limited to the case. For example, there may be a case where the information processing device 100 includes the verification unit 612. Furthermore, a case where the information processing device 100 includes the second generation unit 605 has been described here. However, the present embodiment is not limited to the case. For example, there may be case where the information processing device 100 does not have the second generation unit 605 and another computer has the second generation unit 605.

(Specific Functional Configuration Example of Signature Control System 200)

Next, a specific functional configuration example of the signature control system 200 will be described with reference to FIGS. 7 to 11. For example, specific functional configuration examples of various devices included in the signature control system 200 will be described with reference to FIGS. 7 to 11.

First, a specific functional configuration example of the signature-side terminal 201 corresponding to the author will be described with reference to FIG. 7.

Figure 7:
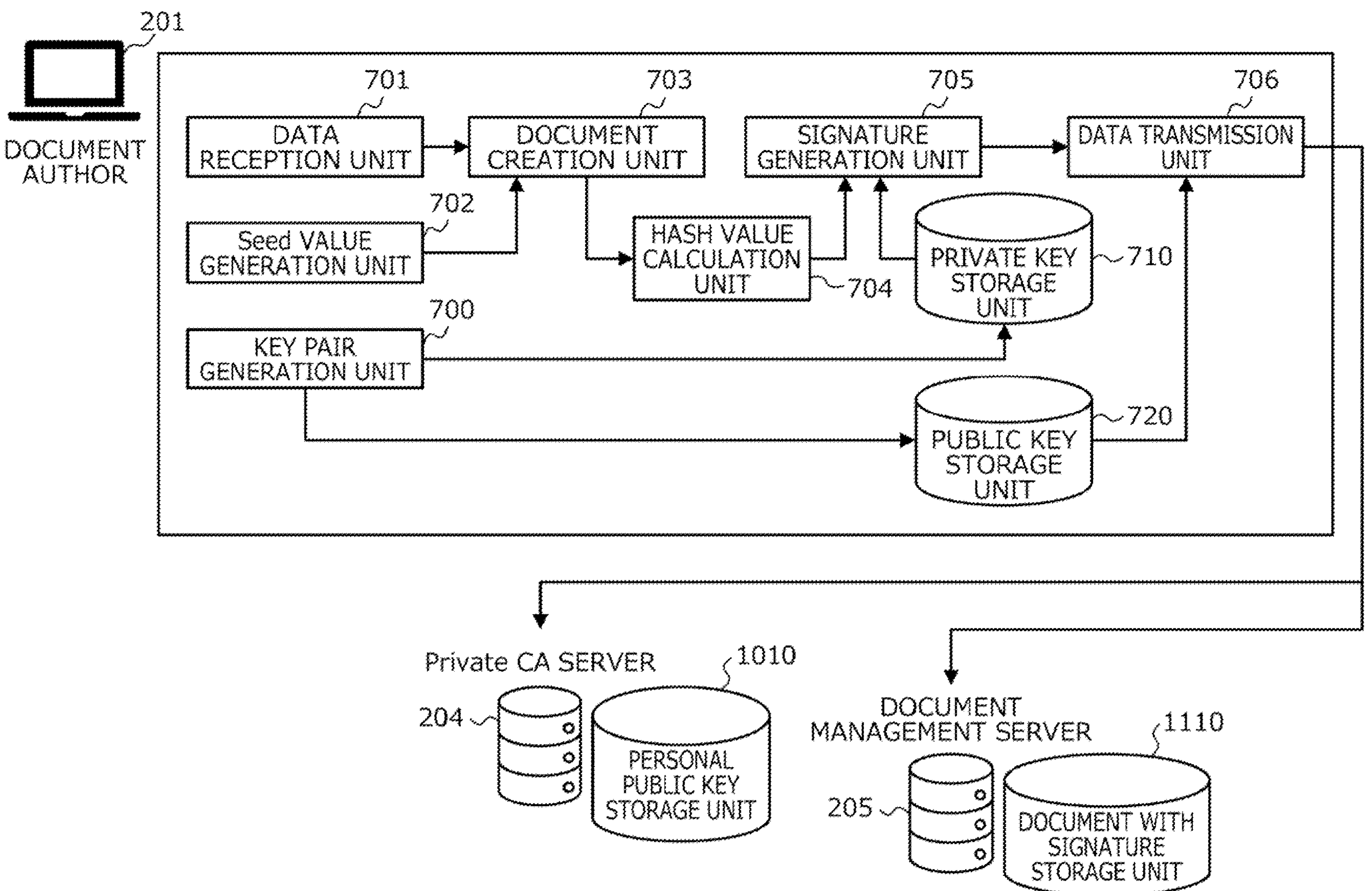
FIG. 7 is a block diagram illustrating a specific functional configuration example of a signature-side terminal 201 corresponding to an author.

FIG. 7 is a block diagram illustrating a specific functional configuration example of the signature-side terminal 201 corresponding to the author. In the signature control system 200, the signature-side terminal 201 corresponding to the author includes a key pair generation unit 700, a data reception unit 701, a seed value generation unit 702, a document creation unit 703, a hash value calculation unit 704, a signature generation unit 705, and a data transmission unit 706.

Furthermore, the signature-side terminal 201 corresponding to the author includes a private key storage unit 710 and a public key storage unit 720. The private key storage unit 710 stores a private key generated by the signature-side terminal 201. The public key storage unit 720 stores a public key generated by the signature-side terminal 201.

The key pair generation unit 700 generates a key pair of the private key and the public key, stores the private key in the private key storage unit 710 and stores the public key in the public key storage unit 720. The data reception unit 701 receives data for generating a message. The seed value generation unit 702 generates a seed. The document creation unit 703 creates a message on the basis of received data. The hash value calculation unit 704 calculates a hash value corresponding to the generated message. The signature generation unit 705 generates a signature to be added to the message on the basis of the calculated hash value.

The data transmission unit 706 transmits a message with signature to which the generated signature is added to the document management server 205. In the document management server 205, the message with signature to which the generated signature is added is stored in a document with signature storage unit 1110, which will be described below with reference to FIG. 11. The data transmission unit 706 transmits the public key to the private CA server 204. In the private CA server 204, the public key is stored in a personal public key storage unit 1010, which will be described below with reference to FIG. 10.

Next, a specific functional configuration example of the signature-side terminal 202 corresponding to the approver will be described with reference to FIG. 8.

Figure 8:
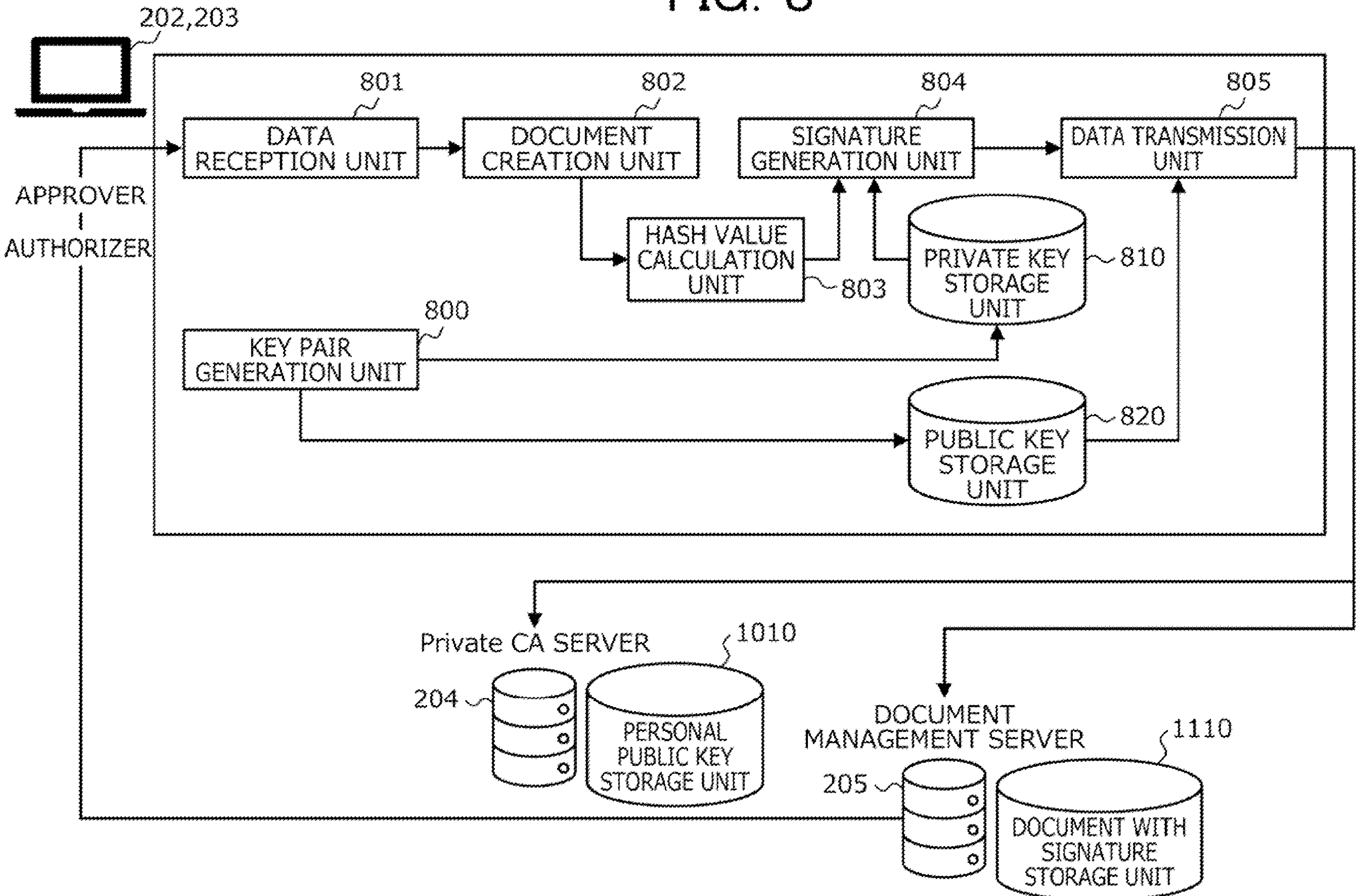
FIG. 8 is a block diagram illustrating a specific functional configuration example of a signature-side terminal 202 corresponding to an approver.

FIG. 8 is a block diagram illustrating a specific functional configuration example of the signature-side terminal 202 corresponding to the approver. In the signature control system 200, the signature-side terminal 202 corresponding to the approver includes a key pair generation unit 800, a data reception unit 801, a document creation unit 802, a hash value calculation unit 803, a signature generation unit 804, and a data transmission unit 805.

Furthermore, the signature-side terminal 202 corresponding to the approver includes a private key storage unit 810 and a public key storage unit 820. The private key storage unit 810 stores a private key generated by the signature-side terminal 202. The public key storage unit 820 stores a public key generated by the signature-side terminal 202.

The key pair generation unit 800 generates a key pair of the private key and the public key, stores the private key in the private key storage unit 810 and stores the public key in the public key storage unit 820. The data reception unit 801 receives a message with signature from the document management server 205. The data reception unit 801 receives data for revising the received message with signature and generating a new message. The document creation unit 802 generates a new message on the basis of the received message with signature and the received data. The hash value calculation unit 803 calculates a hash value corresponding to the generated message. The signature generation unit 804 generates a signature to be added to the message on the basis of the calculated hash value.

The data transmission unit 805 transmits the message with signature to which the generated signature is added to the document management server 205. In the document management server 205, the message with signature to which the generated signature is added is stored in a document with signature storage unit 1110, which will be described below with reference to FIG. 11. The data transmission unit 805 transmits the public key to the private CA server 204. In the private CA server 204, the public key is stored in a personal public key storage unit 1010, which will be described below with reference to FIG. 10.

Furthermore, a specific functional configuration example of the signature-side terminal 203 corresponding to the authorizer is similar to the specific functional configuration example of the signature-side terminal 202 corresponding to the approver, for example.

Next, a specific functional configuration example of the verification-side terminal 207 will be described with reference to FIG. 9.

Figure 9:
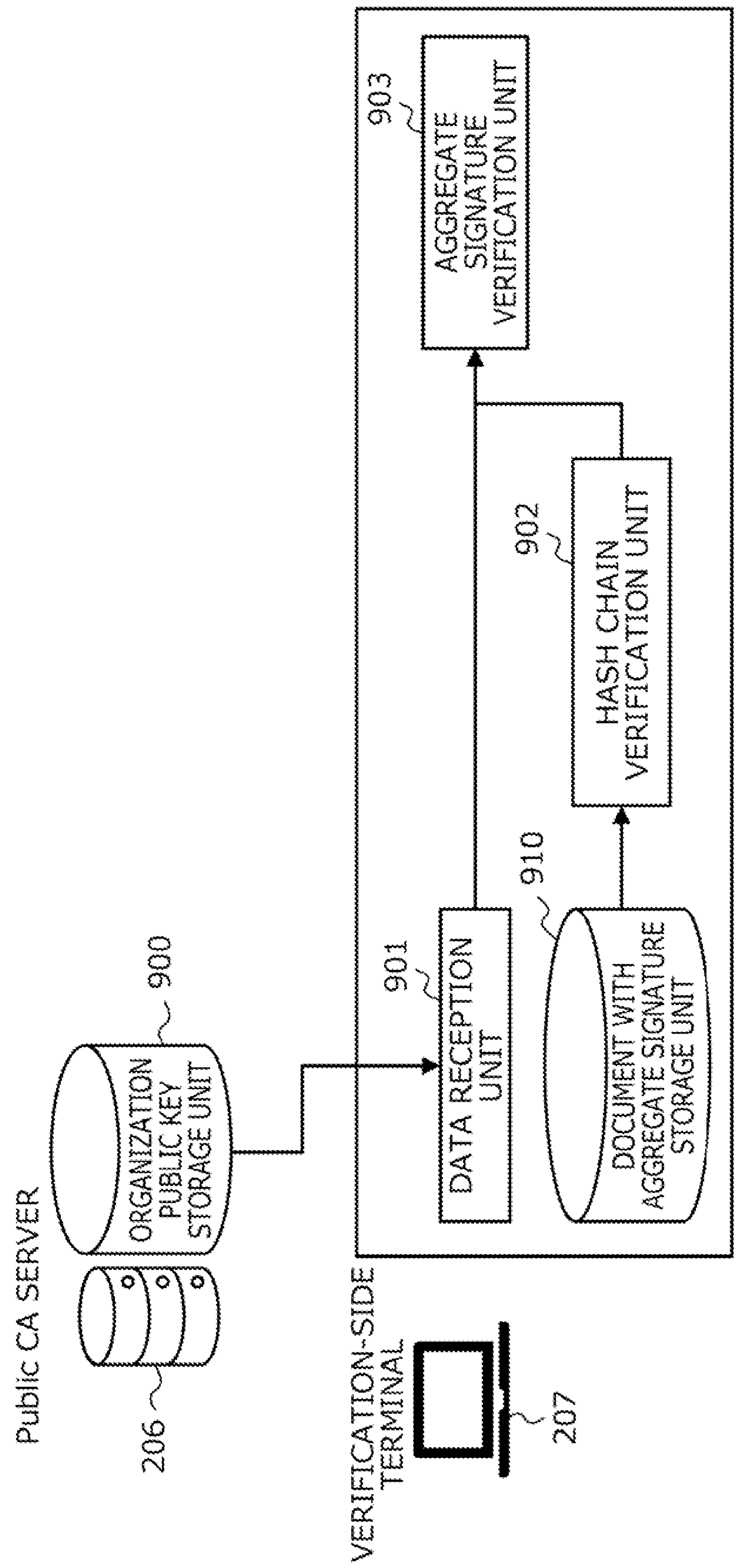
FIG. 9 is a block diagram illustrating a specific functional configuration example of the verification-side terminal 207.

FIG. 9 is a block diagram illustrating a specific functional configuration example of the verification-side terminal 207. In the signature control system 200, the verification-side terminal 207 includes a data reception unit 901, a hash chain verification unit 902, and an aggregate signature verification unit 903. Furthermore, the verification-side terminal 207 includes a document with aggregate signature storage unit 910. Meanwhile, the public CA server 206 includes an organization public key storage unit 900. The organization public key storage unit 900 stores the aggregate public key.

The document with aggregate signature storage unit 910 stores a message with aggregate signature. The message with aggregate signature is transmitted from the document management server 205, for example. The data reception unit 901 receives the aggregate public key to be used when the validity of the aggregate signature is verified from the public CA server 206. The hash chain verification unit 902 verifies the validity of the hash chain corresponding to the message with aggregate signature on the basis of the check hash value added to the message with aggregate signature. The hash chain verification unit 902 passes the message with aggregate signature to the aggregate signature verification unit 903 in a case where the hash chain corresponding to the message with aggregate signature is valid. The aggregate signature verification unit 903 verifies the validity of the aggregate signature added to the message with aggregate signature on the basis of the aggregate public key.

Next, a specific functional configuration example of the private CA server 204 will be described using FIG. 10.

Figure 10:
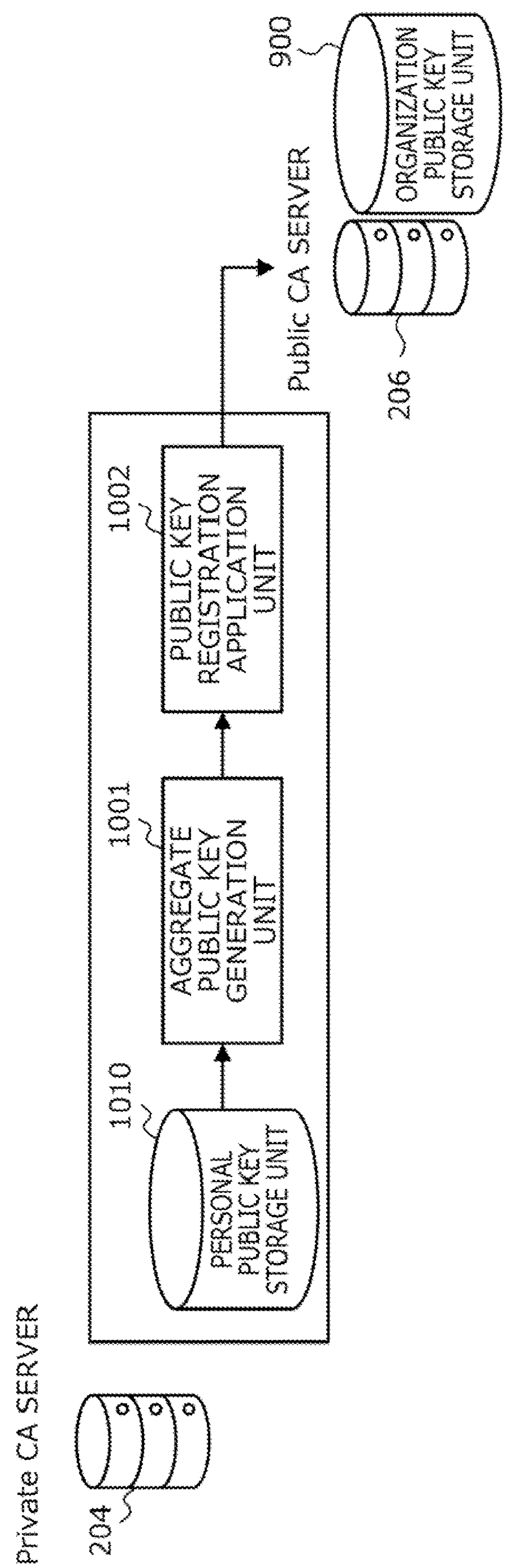
FIG. 10 is a block diagram illustrating a specific functional configuration example of a private CA server 204.

FIG. 10 is a block diagram illustrating a specific functional configuration example of the private CA server 204. In the signature control system 200, the private CA server 204 includes an aggregate public key generation unit 1001 and a public key registration application unit 1002. Furthermore, the private CA server 204 includes a personal public key storage unit 1010. The personal public key storage unit 1010 stores the public keys generated by the respective signature-side terminals 201 to 203.

The aggregate public key generation unit 1001 aggregates the public keys generated by the respective signature-side terminals 201 to 203 and stored in the personal public key storage unit 1010 to generate an aggregate public key. The public key registration application unit 1002 transmits the generated aggregate public key to the public CA server 206. In the public CA server 206, the generated aggregate public key is stored in the organization public key storage unit 900 illustrated in FIG. 9.

Next, a specific functional configuration example of the document management server 205 will be described with reference to FIG. 11.

Figure 11:
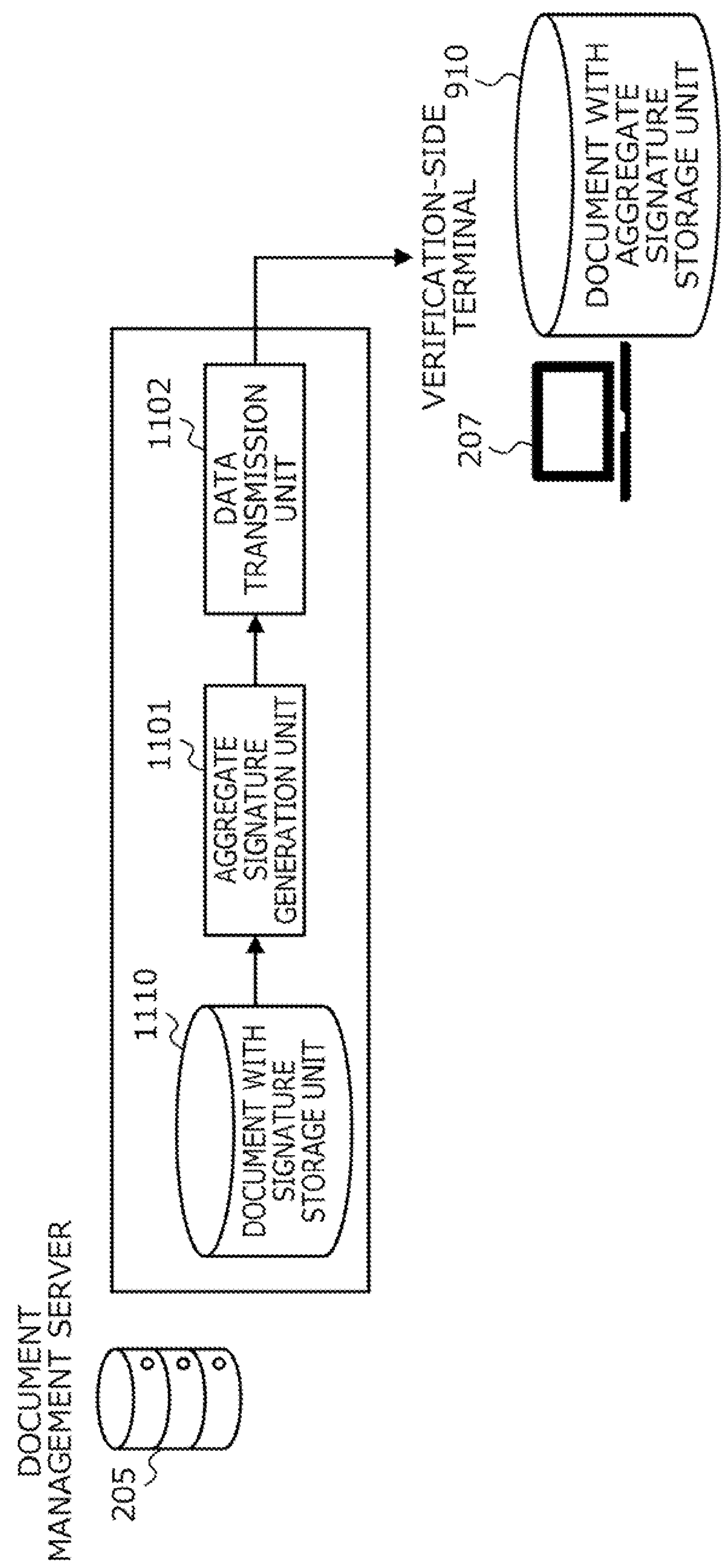
FIG. 11 is an explanatory diagram illustrating a specific functional configuration example of a document management server 205.

FIG. 11 is an explanatory diagram illustrating a specific functional configuration example of the document management server 205. In the signature control system 200, the document management server 205 includes an aggregate signature generation unit 1101 and a data transmission unit 1102. Furthermore, the document management server 205 includes the document with signature storage unit 1110. The document with signature storage unit 1110 stores the messages with signature generated by the respective signature-side terminals 201 to 203.

The aggregate signature generation unit 1101 aggregates the signatures added to the messages with signature stored in the document with signature storage unit 1110 to generate an aggregate signature. The aggregate signature generation unit 1101 adds the generated aggregate signature to the final version of the message to generate a message with aggregate signature. The data transmission unit 1102 transmits the generated message with aggregate signature to the verification-side terminal 207. In the verification-side terminal 207, the generated message with aggregate signature is stored in the document with aggregate signature storage unit 910 illustrated in FIG. 9.

(Example of Operation of Signature Control System 200)

Next, an example of the operation of the signature control system 200 will be described with reference to FIG. 12.

Figure 12:
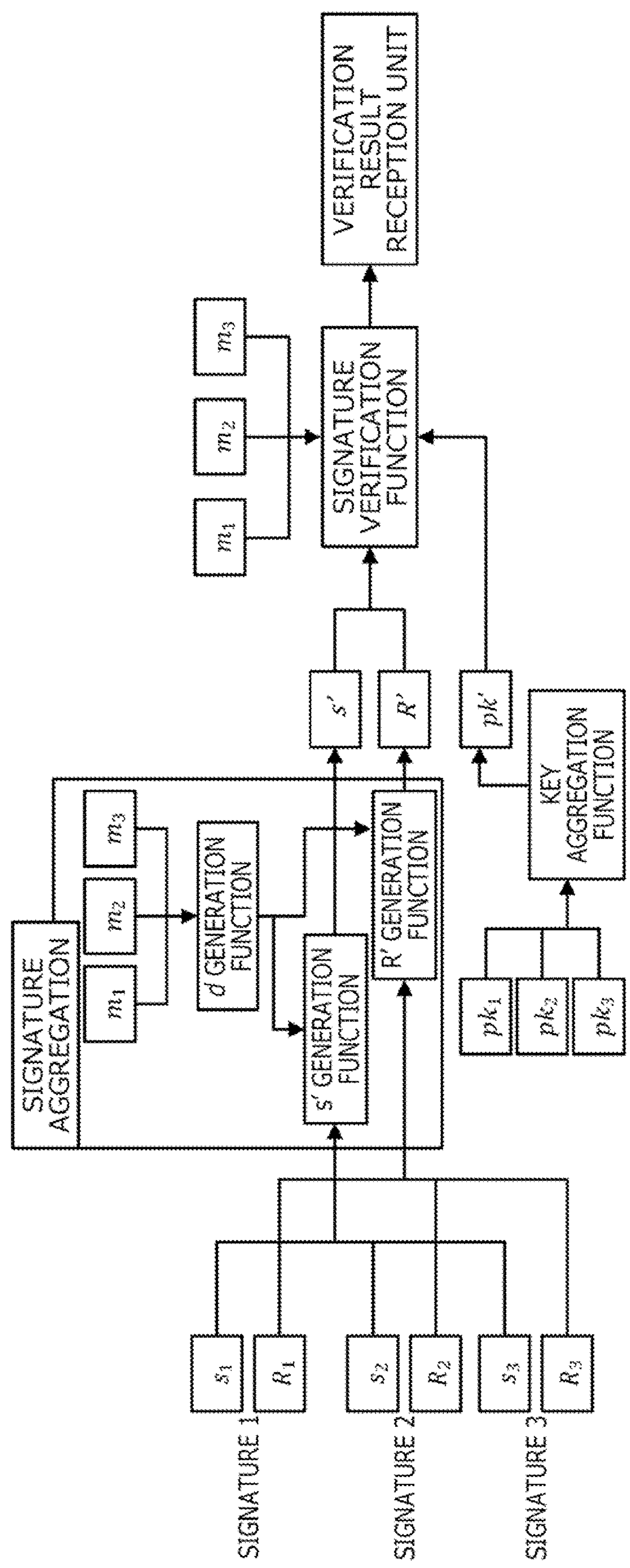
FIG. 12 is an explanatory diagram illustrating an example of an operation of the signature control system 200.

FIG. 12 is an explanatory diagram illustrating an example of the operation of the signature control system 200. In FIG. 12, order is assumed to be p. A remainder group used when, for example, generating a private key or when generating a signature is assumed to be $Z_p=Z/Z_p$. A value used when, for example, generating a public key or when generating a signature is assumed to be g. A cryptographic hash function is assumed to be H(x). As H(x), a secure hash algorithm such as SHA256 or SHA-3 is used, for example.

The signature-side terminals 201 to 203 uniformly and randomly select x from the remainder group $Z_p$ and set x as the private key. The signature-side terminals 201 to 203 set $X:=g^x$ to the public key corresponding to the private key x. The signature-side terminals 201 to 203 generate the signature for a message m on the basis of the private key x. The signature-side terminals 201 to 203 uniformly and randomly select r from the remainder group $Z_p$, for example, and set a signature element $R:=g^r$.

The signature-side terminals 201 to 203 set, for example, a message hash $c:=H(R\|m)$. The signature-side terminals 201 to 203 set a signature element $s:=r+xc(\bmod(p-1))$. The signature-side terminals 201 to 203 set the signature elements s and R to the signature (s, R) for the message m, and transmit the message to the document management server 205.

In the example of FIG. 12, it is assumed that messages $m_1$, $m_2$, and $m_3$ are present. The document management server 205 has messages $m_1$, $m_2$, and $m_3$ and three signatures $(s_1, R_1)$, $(s_2, R_2)$, and $(s_3, R_3)$ corresponding to the messages $m_1$, $m_2$, and $m_3$, respectively.

The document management server 205 aggregates the three signatures $(s_1, R_1)$, $(s_2, R_2)$, and $(s_3, R_3)$ into a single aggregate signature (s', R'). The document management server 205 sets, for example, an auxiliary parameter $d=\{d_i=(\Pi_{rj}\in_{[1,2,3]-[i]]}c_j)\}=\{d_1=c_2\times c_3,\ d_2=c_3\times c_1,\ d_3=c_1\times c_2\}(\bmod(p-1))$. The document management server 205 sets, for example, a signature element $s':=s_1\times d_1+s_2\times d_2+s_3\times d_3(\bmod(p-1))$. The document management server 205 sets, for example, a signature element $R':=R_1^{(d1)}\times R_2^{(d2)}\times R_3^{(d3)}$. The document management server 205 sets the single aggregate signature (s', R').

The document management server 205 aggregates three public keys $X_1$, $X_2$, and $X_3$ into a single aggregate public key X'. The document management server 205 sets, for example, the single aggregate public key $X'=X_1\times X_2\times X_3$. Therefore, the document management server 205 can verify the validity of the single aggregate signature (s', R') without using the three public keys $X_1$, $X_2$, and $X_3$ and can perform verification by using the aggregate public key X'. Therefore, the document management server 205 can reduce the number of public keys used when verifying the validity of the single aggregate signature (s', R') and can reduce the cost incurred when verifying the validity of the single aggregate signature (s', R').

The verification-side terminal 207 verifies the validity of the aggregate signature (s', R') on the basis of the aggregate public key X'. The verification-side terminal 207 sets message hashes $c_1 := H(R_1 \| m_1)$, $c_2 := H(R_2 \| m_2)$, and $c_3 := H(R_3 \| m_3)$. The verification-side terminal 207 calculates $c' := c_1 \times c_2 \times c_3$ and determines whether $q^{(s')}$ matches $R' \times (X')^{(c')}$ or not. In a case of determining they match, the verification-side terminal 207 determines that the single aggregate signature (s', R') is valid. On the other hand, in a case of determining they do not match, the verification-side terminal 207 determines that the single aggregate signature (s', R') is not valid.

As a result, the verification-side terminal 207 can verify the validity of the single aggregate signature (s', R') and determine whether messages $m_2$, and $m_3$ are valid or not. Furthermore, the verification-side terminal 207 can verify the validity of the single aggregate signature (s', R') and determine whether the three signatures $(s_1, R_1)$, $(s_2, R_2)$, and $(s_3, R_3)$ are valid or not. Therefore, the verification-side terminal 207 can improve security. The verification-side terminal 207 can verify the validity of the single aggregate signature (s', R') on the basis of the single aggregate public key X' regardless of the number of signatures, and can reduce the processing amount for the verification.

(Specific Example of Operation of Signature Control System 200)

Next, specific examples of the operation of the signature control system 200 will be described with reference to FIGS. 13 to 15.

Figure 13:
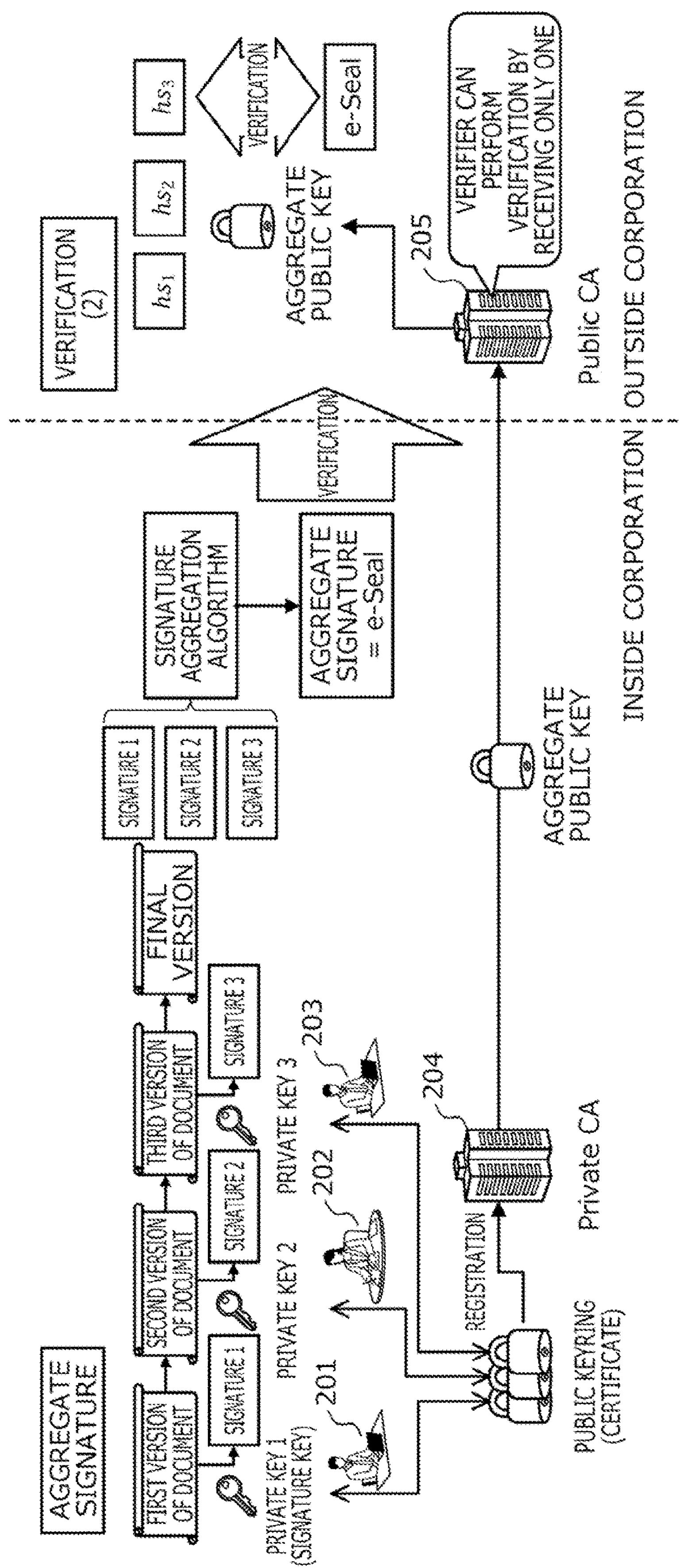
FIG. 13 is an explanatory diagram (part 1) illustrating a specific example of the operation of the signature control system 200.
Figure 14:
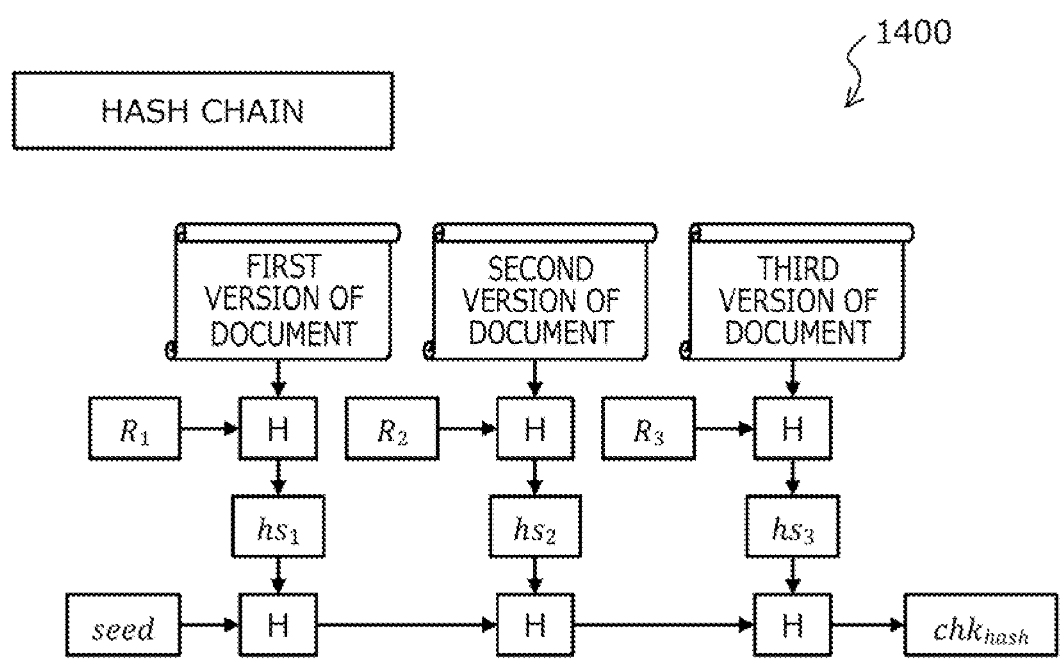
FIG. 14 is an explanatory diagram (part 2) illustrating a specific example of the operation of the signature control system 200.
Figure 15:
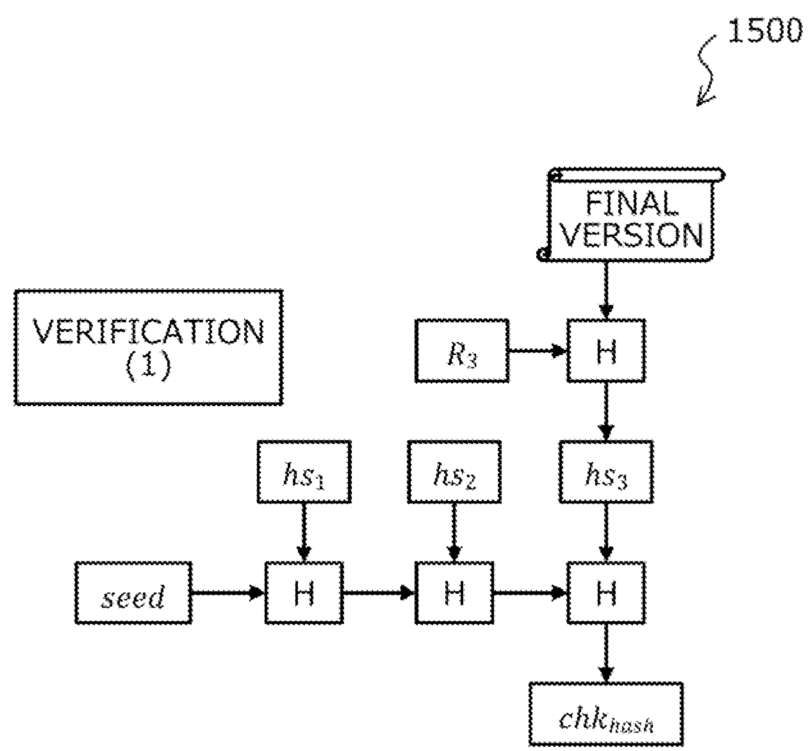
FIG. 15 is an explanatory diagram (part 3) illustrating a specific example of the operation of the signature control system 200.

FIGS. 13 to 15 are explanatory diagrams illustrating specific examples of the operation of the signature control system 200. In a specific example, the signature control system 200 enables verification for a process in which a plurality of versions of documents is generated on the basis of the content of the final version of the document while hiding documents other than the final version among the plurality of versions of documents from the verifier.

In FIG. 13, the author creates a first version of the document. The approver creates a second version of the document on the basis of the first version of the document. The authorizer creates a third edition of the document on the basis of the second version of the document. The third version of the document is finalized as the final version of the document. In this way, the situation is that the document is revised step by step.

The document management server 205 acquires the first version of the document and a signature $1 := (s_1, R_1)$ corresponding to the first version of the document generated by the signature-side terminal 201 by the author. The document management server 205 acquires the second version of the document based on the first version of the document and a signature $2 := (s_2, R_2)$ corresponding to the second version of the document generated by the signature-side terminal 202 by the approver. The document management server 205 acquires the third version of the document based on the second version of the document and a signature $3 := (s_3, R_3)$ corresponding to the third version of the document generated by the signature-side terminal 203 by the authorizer. The document management server 205 obtains the final version of the document based on the third version of the document.

The document management server 205 aggregates the signature $1 := (s_1, R_1)$, the signature $2 := (s_2, R_2)$, and the signature $3 := (s_3, R_3)$ into the single aggregate signature (s', R'). The single aggregate signature (s', R') becomes an e-Seal representing the corporation.

The document management server 205 sets, for example, an auxiliary parameter $d = \{d_i = (\Pi_{ij} \in_{[1,2,3]-[i]]} c_j)\} = \{d_1 = c_2 \times c_3, d_2 = c_3 \times c_1, d_3 = c_1 \times c_2\} (\mathrm{mod}(p-1))$. An example of setting the auxiliary parameter d will be specifically described below with reference to FIGS. 17 and 18.

The document management server 205 sets, for example, a signature element $s' := s_1 \times d_1 + s_2 \times d_2 + s_3 \times d_3 (\mathrm{mod}(p-1))$. The document management server 205 sets, for example, a signature element $R' := R_1^{(d1)} \times R_2^{(d2)} \times R_3^{(d3)}$. The document management server 205 generates the single aggregate signature (s', R').

The private CA server 204 aggregates the public keys $X_1$, $X_2$, and $X_3$ to generate an aggregate public key $X' = X_1 \cdot X_2 \cdot X_3$. The private CA server 204 transmits the aggregate public key X' to the public CA server 206 located outside the corporation. Here, the description will move onto FIG. 14.

In FIG. 14, the document management server 205 generates a hash chain 1400 and a check hash value $chk_{hash}$. The document management server 205 generates the check hash value $chk_{hash}$ on the basis of, for example, the hash chain 1400 formed from the seed value and a message hash $hs_1$ of each version of the document.

Specifically, the document management server 205 calculates a first hash value on the basis of the seed value and a message hash $hs_1$ of the first version of the document, using a hash function. Specifically, the document management server 205 calculates a second hash value on the basis of the calculated first hash value and a message hash $hs_2$ of the second version of the document, using the hash function. Specifically, the document management server 205 calculates a third hash value on the basis of the calculated second hash value and a message hash $hs_3$ of the third version of the document, using the hash function.

The document management server 205 sets the third hash value to the check hash value $chk_{hash}$. The document management server 205 groups the seed value, the message hash $hs_1$ of the first version of the document, the message hash $hs_2$ of the second version of the document, the final version of the document=the third version of the document, and the check hash value $chk_{hash}$ together as a combination of verification information.

Returning to the description of FIG. 13, the document management server 205 associates the grouped verification information with the generated single aggregate signature (s', R') to transmit thereof to the verification-side terminal 207. The verification-side terminal 207 receives the grouped verification information and the generated single aggregate signature (s', R'). The verification-side terminal 207 acquires the generated aggregate public key X' from the public CA server 206. Here, the description will move onto FIG. 15.

In FIG. 15, the verification-side terminal 207 generates a hash chain 1500 and a check hash value $chk_{hash}$. The verification-side terminal 207 generates the check hash value $chk_{hash}$ on the basis of, for example, the hash chain 1500 formed from the seed value, a message hash $hs_1$ of the first version of the document, a message hash $hs_2$ of the second version of the document, and the final version of the document.

Specifically, the verification-side terminal 207 calculates a first hash value on the basis of the seed value and the message hash $hs_1$ of the first version of the document, using the hash function. Specifically, the verification-side terminal 207 calculates a second hash value on the basis of the calculated first hash value and the message hash $hs_2$ of the second version of the document, using the hash function. Specifically, the verification-side terminal 207 calculates a message hash $hs_3$, of the final version of the document=the third version of the document, using the hash function. Specifically, the verification-side terminal 207 calculates a third hash value on the basis of the calculated second hash value and the message hash $hs_3$ of the third version of the document, using the hash function.

The verification-side terminal 207 sets the third hash value to the check hash value $chk_{hash}$. The verification-side terminal 207 determines whether the set check hash value $chk_{hash}$ matches or not the check hash value $chk_{hash}$ included in the received verification information. Here, in a case of determining they match, the verification-side terminal 207 determines that the hash chain 1500 is valid. On the other hand, in a case of determining they do not match, the verification-side terminal 207 determines that the hash chain 1500 is not valid and the final version of the document is not valid.

Returning to the description of FIG. 13, in a case of determining that the hash chain 1500 is valid, the verification-side terminal 207 verifies the validity of the received single aggregate signature (s', R') on the basis of the received aggregate public key X'. The verification-side terminal 207 acquires, for example, message hashes $c_1$=H ($R_1$||$m_1$), $c_2$=H ($R_2$||$m_2$), and $c_3$=H ($R_3$||$m_3$), and calculates $c'=c_1c_2c_3$. Here, in a case where $q^{(s')}\equiv R'(X')^{c'}$ is satisfied, the verification-side terminal 207 determines that the single aggregate signature (s', R') is valid. On the other hand, in a case where $g^{(s')}\equiv R'(X')^{c'}$ is not satisfied, the verification-side terminal 207 determines that the single aggregate signature (s',R') is not valid and the final version of the document is not valid.

The verification-side terminal 207 determines that the final version of the document is valid in the case where the hash chain 1500 is valid and the single aggregate signature (s', R') is valid. Therefore, the verification-side terminal 207 can prevent the verifier from mistakenly recognizing an invalid document as a valid document. The verification-side terminal 207 can verify the validity of the single aggregate signature (s', R') by acquiring the single aggregate public key X' without acquiring a plurality of public keys. As a result, the verification-side terminal 207 can reduce the cost incurred when verifying the validity of the single aggregate signature (s', R'). To verify the validity of the hash chain 1500, the verification-side terminal 207 can confirm that the first and second versions of the document have not been falsified or replaced. Therefore, the verification-side terminal 207 can improve security.

Example of Verifying Signature

Next, an example in which the document management server 205 verifies the signature in the case where the single aggregate signature (s', R') is determined not to be valid will be described with reference to FIG. 16.

Figure 16:
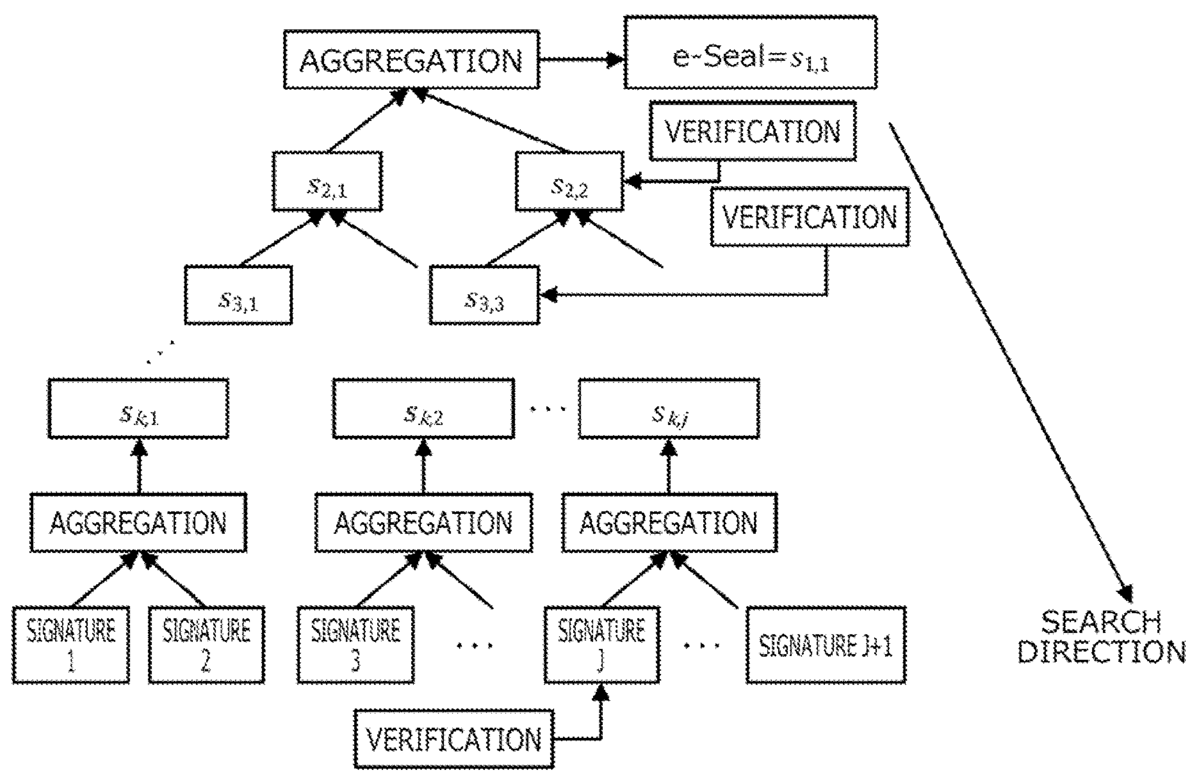
FIG. 16 is an explanatory diagram illustrating an example of verifying a signature.

FIG. 16 is an explanatory diagram illustrating an example of verifying a signature. In FIG. 16, the document management server 205 detects that the single aggregate signature (s', R') has been determined not to be valid and verification has failed. The document management server 205 receives, for example, a notification from the verification-side terminal 207 that the verification of the single aggregate signature (s', R') has failed. In this case, it is considered that at least one of the signatures that are aggregation sources of the single aggregate signature (s',R') has a cause of the verification failure.

Therefore, it is desired that the document management server 205 finds the signature that causes the verification failure and causes the signature-side terminals 201 to 203 to regenerate the signature that causes the verification failure. The document management server 205 finds the signature that causes the verification failure by verifying the validity of each signature j (j=1 to N) of N signatures that are the aggregation sources, for example. Therefore, the document management server 205 can cause the signature-side terminals 201 to 203 to regenerate the signature that caused the verification failure.

Here, a case where the document management server 205 verifies the validity of each signature j (j=1 to N) of N signatures that are the aggregation sources and finds the signature that causes the verification failure has been described, but the embodiment is not limited to the case. For example, there may be a case where the document management server 205 further reduces the processing amount incurred when finding the signature that causes verification failure.

In this case, the document management server 205 preliminarily generates an aggregate signature $s_{x,y}$ obtained by aggregating some signatures among (j+1) signatures that are the aggregation sources, and registers the aggregate signature $s_{x,y}$ in a list in generating a single aggregate signature $s_{1,1}$=(s', R'). For example, the document management server 205 aggregates signatures adjacent to each other among (j+1) signatures arranged in numerical order, generates an aggregate signature $s_{x=k,y}$ belonging to a row x=k, and registers the aggregate signature $s_{x=k,y}$ in the list. For example, y=1, 2, 3, . . . .

The document management server 205 aggregates, in a recursively repeated manner, the signatures adjacent to each other among the aggregate signatures $s_{x=i+1,y}$ belonging to the lower row x=i+1 to generate an aggregate signature $s_{x=i,y}$ belonging to the upper row x=i, and registers the generated aggregate signature in the list in a manner that a relationship between the aggregation source and an aggregation destination is specifiable. Finally, the document management server 205 generates the single aggregate signature $s_{1,1}$=(s', R').

When detecting that verification of the single aggregate signature (s', R') has failed, the document management server 205 reads the list. The document management server 205 verifies the validity of the aggregate signature $s_{x=2,y}$ belonging to the row x=2 in the list. The document management server 205 repeats verification of the validity of the aggregate signature $s_{x=i+1,y}$ belonging to the lower row x=i+1, which was the aggregation source of the aggregate signature $s_{x=i,y}$ determined not to be valid, among the aggregate signature $s_{x=i,y}$ belonging to the upper row x=i. Therefore, the document management server 205 can find the signature j that is not valid. Furthermore, the document management server 205 can suppress the processing amount incurred when finding the signature that causes verification failure to O(log(N)).

(Example of Setting Auxiliary Parameter d)

Next, an example in which the document management server 205 sets the auxiliary parameter d will be described with reference to FIGS. 17 and 18.

Figure 17:
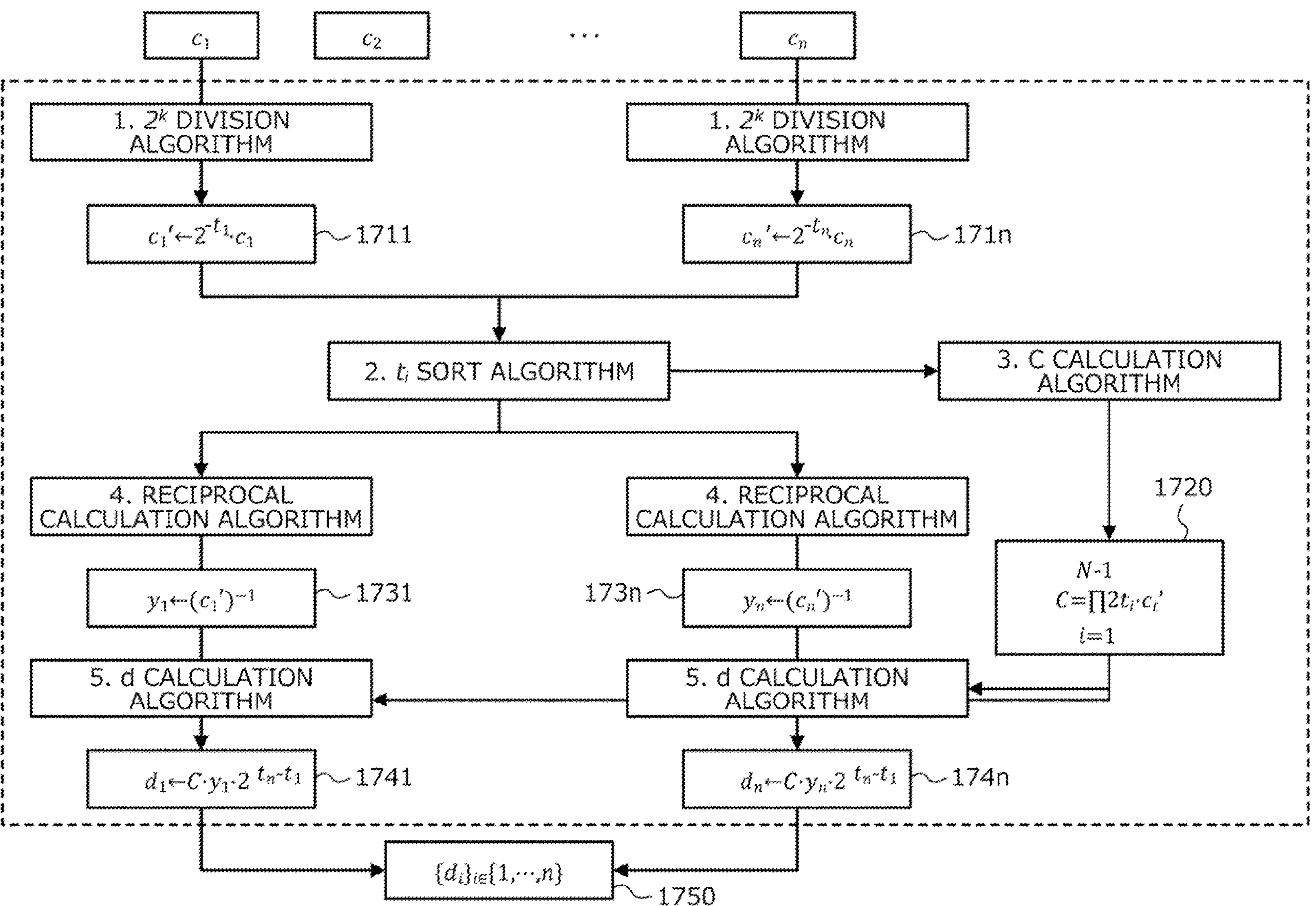
FIG. 17 is an explanatory diagram (part 1) illustrating an example of setting an auxiliary parameter d.

FIGS. 17 and 18 are explanatory diagrams illustrating an example of setting the auxiliary parameter d. The document management server 205 efficiently calculates the auxiliary parameter d using properties of remainders. The document management server 205 sets, for example, the order p to a safe prime. The safe prime is p that makes q of p=2q+1 be a prime.

(17-1) The document management server 205 performs binary expansion of each message hash $c_i$ by a $2^k$ division algorithm to transform the message hash $c_i$ into a format of "$c_i' \leftarrow 2\hat{}(-t_i) \cdot c_i$" illustrated in mathematical expressions 1711 to 171n.

(17-2) The document management server 205 sorts the format of "$c_i' \leftarrow 2\hat{}(-t_i) \cdot c_i$" illustrated in the mathematical expressions 1711 to 171n in order of $t_1 \le t_2 \le \ldots \le t_N$ using a $t_i$ sort algorithm.

(17-3) The document management server 205 calculates C illustrated in the mathematical expression 1720 using a C calculation algorithm.

(17-4) The document management server 205 calculates a reciprocal $y_i$ illustrated in the mathematical expressions 1731 to 173n for each $c_i'$ using a reciprocal calculation algorithm.

(17-5) The document management server 205 calculates $d_i$ illustrated in the mathematical expressions 1741 to 174n on the basis of the calculated C and each reciprocal $y_i$ using a d calculation algorithm.

(17-6) The document management server 205 groups up the calculated $d_i$ and sets the auxiliary parameter d illustrated in the mathematical expression 1750. Next, description will move onto FIG. 18.

Table 1800 in FIG. 18 illustrates a processing time spent on setting the auxiliary parameter d. Table 1800 illustrates the processing time spent on setting the auxiliary parameter d by the method illustrated in FIG. 17, for example. Furthermore, Table 1800 illustrates, for example, as a comparative example, the processing time spent on setting the auxiliary parameter d by a method of calculating d= $\{d_i = \varepsilon_j \in_{[N]-[i]} c_j\}(\text{mod}(p-1))$.

As illustrated in Table 1800, the document management server 205 can reduce the processing time spent on setting the auxiliary parameter d according to the method illustrated in FIG. 17 compared to the method of the comparative example. The document management server 205 can, for example, make the processing time O(N) instead of $O(N^2)$. According to the method illustrated in FIG. 17, the document management server 205 can set the auxiliary parameter d in a relatively short processing time even if the number of signatures increases.

Example of Revising Aggregate Signature

Next, an example of revising the aggregate signature will be described with reference to FIGS. 19 and 20.

Figure 19:
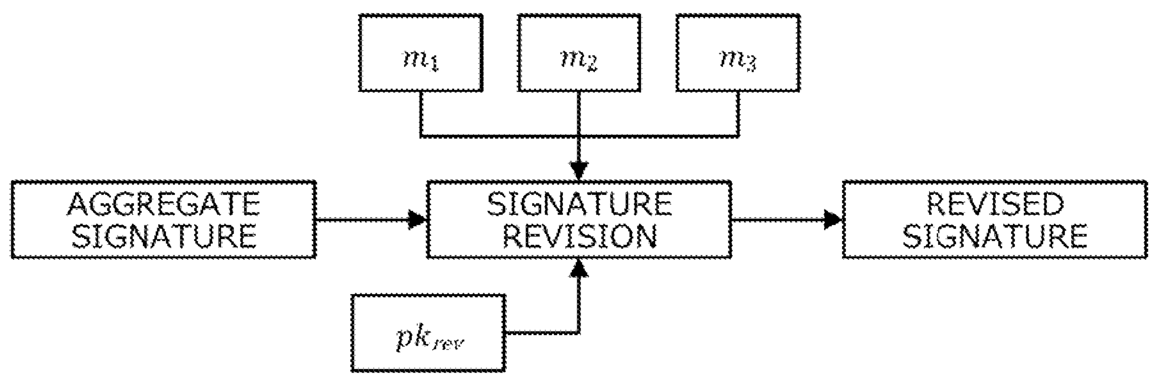
FIG. 19 is an explanatory diagram (part 1) illustrating an example of revising an aggregate signature.
Figure 20:
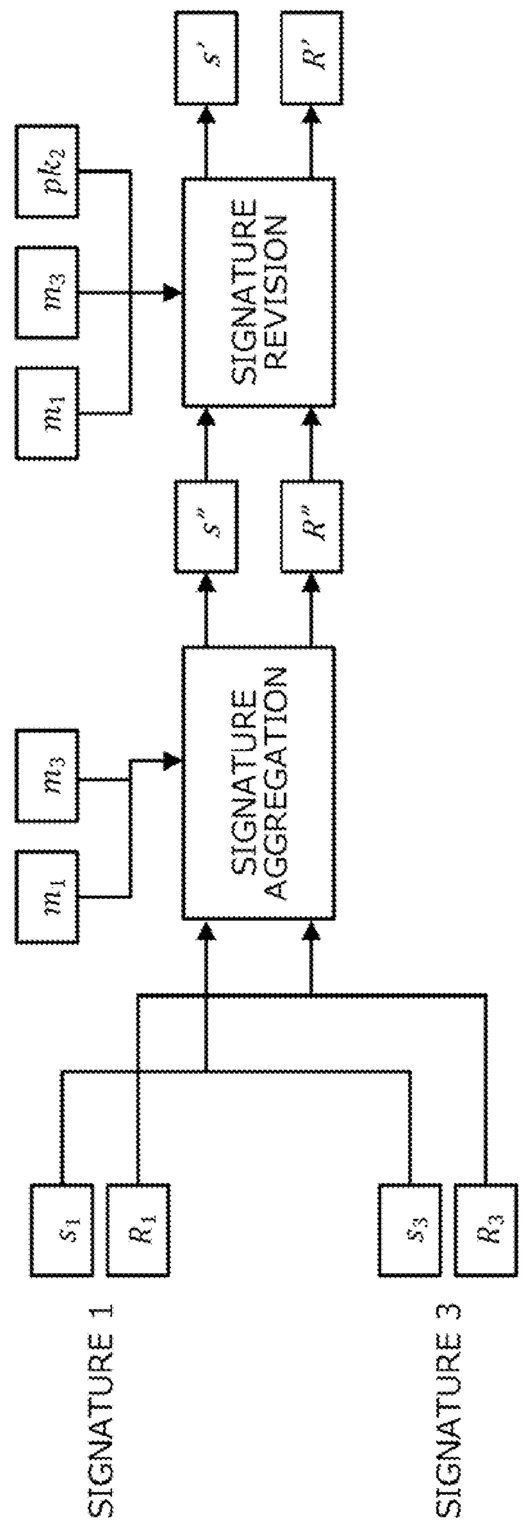
FIG. 20 is an explanatory diagram (part 2) illustrating the example of revising the aggregate signature.

FIGS. 19 and 20 are explanatory diagrams illustrating an example of revising the aggregate signature. For example, there is a case where one of the approvers cannot approve the document, cannot operate the signature-side terminals 201 to 203, and cannot add the signature to the document, which are defined in the approval flow. Specifically, there is a case where one of the approvers is absent due to on vacation, on a business trip or the like, cannot operate the signature-side terminals 201 to 203, and cannot add the signature to the document.

However, if the signature control system 200 cannot generate the aggregate signature that is verifiable with the aggregate public key in the case where one of the approvers is on vacation, on a business trip or the like, the convenience of the signature control system 200 will be lowered. Therefore, it is desirable that, in the signature control system 200, the public key is temporarily invalidated and an aggregate signature verifiable with the aggregate public key is made generable even if the signature is not added to the document by one of the approvers. Furthermore, in the case where the approver is on vacation, on a business trip or the like, changing the approval flow and redistributing the aggregate public key is not favorable from the viewpoint of work costs and the like.

In FIG. 19, the document management server 205 corrects the aggregate signature in which the signature corresponding to one of the approvers is not aggregated and generates a revised signature on the basis of a message $m_i$ and a public key $pk_{rev}$ to be invalidated corresponding to the one of the approvers. The revised signature is a signature verifiable with the aggregate public key X' in which the public keys $pk_{rev}$ corresponding to one of the approvers is aggregated. For example, i=1, 2, or 3. Here, the description will move onto FIG. 20, and a specific example in which the document management server 205 revises the aggregate signature will be described.

In FIG. 20, the document management server 205 receives designation of the public key $X_2$ to be invalidated. Here, the generated aggregate signature is ($S''=s_1c_3+s_3c_1$, $R''=R_1^{(c3)}R_3^{(c2)}$), which is information in which the signature ($s_2$, $R_2$) verifiable with the public key $X_2$ is not aggregated. The document management server 205 revises the aggregate signature (S'', R'') to generate a revised signature verifiable with the aggregate public key $X'=X_1X_2X_3$. To become verifiable with the aggregate public key $X'=X_1X_2X_3$, the revised signature may be generated so that the following expression (1) holds.

$$g^{(s')} \equiv R'(X')^{(c')}(\text{mod}(p)$$

$$\because g^{(s')} \equiv R''(X_1X_3)^{(c1c3)}$$

$$\equiv X_2^{(-c1c3)}R''(X_1X_2X_3)^{(c1c3)}$$

$$\equiv R'(X')^{(c')} \tag{1}$$

Specifically, the document management server 205 revises the aggregate signature (S'', R'') so that the above expression (1) holds. More specifically, the document management server 205 generates a revised signature s'=(s'', $R'=X_2^{(-c1c3)}R''$) that is verifiable with the aggregate public key $X'=X_1X_2X_3$ on the basis of the aggregate signature (S'', R''), the messages $m_1$ and $m_3$, and the public key $pk_2=X_2$ to be invalidated. Therefore, the document management server 205 can generate the revised signature s' verifiable with the aggregate public key X even if the approver is absent. Therefore, the document management server 205 can temporarily invalidate the public key, and can improve the convenience of the signature control system 200.

(Effect by Signature Control System 200)

Next, the effect by the signature control system 200 will be described with reference to FIG. 21.

FIG. 21 is an explanatory diagram illustrating effects by the signature control system 200. Table 2100 in FIG. 21 illustrates the number of public keys managed by the private CA server 204 and the number of public keys managed by the public CA server 206. Table 2100 illustrates the number of public keys managed by the private CA server 204 and the number of public keys managed by the public CA server 206 in the signature control system 200, for example. Furthermore, Table 2100 illustrates the number of public keys managed by a conventional private CA server 204 and the number of public keys managed by a conventional public CA server 206, for example.

As illustrated in Table 2100, the signature control system 200 can reduce the number of public keys managed by the public CA server 206 from N to 1 compared to the conventional system. Therefore, the signature control system 200 can reduce the cost incurred when managing the public keys and the cost incurred when using the public keys.

Specifically, in a case where a data length of the public key is 2048 [bits], the conventional public CA server 206 stores 2048×100 [bits] of information in a case where there are 100 approvers. Therefore, conventionally, the processing cost incurred when verifying the validity of the aggregate signature is O(N).

Meanwhile, the signature control system 200 only needs to use the single aggregate public key when verifying the validity of the aggregate signature, and thus can reduce the processing cost incurred when verifying the validity of the aggregate signature to O(1). The signature control system 200 can fix the information managed by the public CA server 206 to 2048 [bits] regardless of the number of approvers.

(Key Generation Processing Procedure)

Next, an example of a key generation processing procedure executed by the signature control system 200 will be described with reference to FIG. 22. The key generation processing is implemented by, for example, the CPU 301, a storage area such as the memory 302 or the recording medium 305, the network I/F 303 illustrated in FIG. 3, and the like.

FIG. 22 is a flowchart illustrating an example of a key generation processing procedure. In FIG. 22, the private CA server 204 transmits a key generation request to the signature-side terminals 201 to 203 corresponding to the author, approver, and authorizer (step S2201).

Meanwhile, when receiving the key generation request, the signature-side terminals 201 to 203 generate a key pair of a private key $x_i$ and a public key $X_i$ (step S2202). Next, the signature-side terminals 201 to 203 store the generated private key $x_i$ (step S2203). The signature-side terminals 201 to 203 then store the generated public key $X_i$ (step S2204). The signature-side terminals 201 to 203 then transmit the generated public key $X_i$ to the private CA server 204 (step S2205).

Meanwhile, the private CA server 204 receives the public key $X_i$ from each of the signature-side terminals 201 to 203 (step S2206). i=1, 2, or 3. Next, the private CA server 204 generates and stores the aggregate public key X' obtained by aggregating the public keys X (step S2207). The private CA server 204 then transmits a request for creating a digital certificate for the aggregate public key X', including the aggregate public key X', to the public CA server 206 (step S2208).

Meanwhile, when receiving the request for creating a digital certificate for the aggregate public key X', the public CA server 206 creates the digital certificate for the aggregate public key X' and transmits the digital certificate to the private CA server 204 (step S2209).

Meanwhile, the private CA server 204 stores the received digital certificate of the aggregate public key X' (step S2210). Next, the private CA server 204 creates and stores a digital certificate for the public key $X_i$ (step S2211). Thereafter, the signature control system 200 terminates the key generation processing.

(Document Creation Processing Procedure)

Next, an example of a document creation processing procedure executed by the signature control system 200 will be described with reference to FIG. 23. The document creation processing is implemented by, for example, the CPU 301, a storage area such as the memory 302 or the recording medium 305, the network I/F 303 illustrated in FIG. 3, and the like.

FIG. 23 is a flowchart illustrating an example of a document creation processing procedure. In FIG. 23, the signature-side terminal 201 generates a seed and transmits the seed to the document management server 205 (step S2301).

Meanwhile, the document management server 205 receives the seed (step S2302).

Meanwhile, the signature-side terminal 201 generates a document $m_1$ (step S2303). Next, the signature-side terminal 201 generates a hash value $hs_1$ on the basis of the seed and document $m_1$ (step S2304). Then, the signature-side terminal 201 obtains a private key $x_1$ (step S2305).

Next, the signature-side terminal 201 generates a signature $\sigma_1$ for the document $m_1$ on the basis of the private key $x_1$ (step S2306). Then, the signature-side terminal 201 transmits the document $m_1$, the hash value $hs_1$, and the signature $\sigma_1$ to the document management server 205 (step S2307).

Meanwhile, the document management server 205 receives the document $m_1$, the hash value $hs_1$, and the signature $\sigma_1$ from the signature-side terminal 201 (step S2308). Next, the document management server 205 determines whether the received hash value $hs_1$ corresponds to the received seed and the received document $m_1$ or not (step S2309).

Here, in a case where the received hash value $hs_1$ does not correspond to the received seed and the received document $m_1$ (step S2309: verification failure), the document management server 205 transmits a verification failure notification to the signature-side terminal 201. Then, the signature-side terminal 201 proceeds to the processing of step S2312. On the other hand, in a case where the received hash value $hs_1$ corresponds to the received seed and the received document $m_1$ (step S2309: verification success), the document management server 205 determines that the verification has succeeded and proceeds to the processing of steps S2310 and S2311.

The document management server 205 acquires the public key $X_1$ (step S2310). Then, the document management server 205 determines whether the received signature $\sigma_1$ is valid or not on the basis of the public key $X_1$ (step S2311).

Here, in a case where the received signature $\sigma_1$ is not valid (step S2311: verification failure), the document management server 205 transmits the verification failure notification to the signature-side terminal 201. Then, the signature-side terminal 201 proceeds to the processing of step S2312. On the other hand, in a case where the received signature $\sigma_1$ is valid (step S2311: verification success), the document management server 205 determines that the verification has succeeded and proceeds to the processing of step S2313.

In step S2312, when receiving the verification failure notification, the signature-side terminal 201 regenerates the signature $\sigma_1$ (step S2312). Then, the signature-side terminal 201 returns to the processing of step S2301.

In step S2313, the document management server 205 stores the received document $m_1$, the received hash value $hs_1$, and the received signature $\sigma_1$ in the control information management table 400 of its own device (step S2313). Next, the document management server 205 transmits a notification that the document $m_1$ has been registered to the signature-side terminal 201 (step S2314).

Meanwhile, the signature-side terminal 201 receives the notification that the document $m_1$ has been registered (step S2315). Thereafter, the signature control system 200 terminates the document creation processing.

(Document Approval Processing Procedure)

Next, an example of a document approval processing procedure executed by the signature control system 200 will be described with reference to FIG. 24. The document approval processing is implemented by, for example, the CPU 301, a storage area such as the memory 302 or the recording medium 305, the network I/F 303 illustrated in FIG. 3, and the like.

FIG. 24 is a flowchart illustrating an example of a document approval processing procedure. In FIG. 24, the document management server 205 transmits the stored document $m_1$, hash value $hs_1$, and signature $\sigma_1$ to the signature-side terminal 202 corresponding to the approver (step S2401).

Meanwhile, the signature-side terminal 201 receives the document $m_1$, the hash value $hs_1$, and the signature $\sigma_1$ (step S2402). Next, the signature-side terminal 202 generates a document $m_2$ (step S2403). Then, the signature-side terminal 202 generates a hash value $hs_2$ on the basis of the hash value $hs_1$ and the document $m_2$ (step S2404).

Next, the signature-side terminal 202 obtains a private key $x_2$ (step S2405). Then, the signature-side terminal 202 generates a signature $\sigma_2$ for the document $m_2$ on the basis of the private key $x_2$ (step S2406). Then, the signature-side terminal 202 transmits the document $m_2$, the hash value $hs_2$, and the signature $\sigma_2$ to the document management server 205 (step S2407).

Meanwhile, the document management server 205 receives the document $m_2$, the hash value $hs_2$, and the signature $\sigma_2$ from the signature-side terminal 202 (step S2408). Then, the document management server 205 determines whether the received hash value $hs_2$ corresponds to the hash value $hs_1$ and the received document $m_2$ or not (step S2409).

Here, in a case where the received hash value $hs_2$ does not correspond to the hash value $hs_1$ and the received document $m_2$ (step S2409: verification failure), the document management server 205 transmits a verification failure notification to the signature-side terminal 202. Then, the signature-side terminal 202 proceeds to the processing of step S2412. On the other hand, in a case where the received hash value $hs_2$ corresponds to the hash value $hs_1$ and the received document $m_2$ (step S2409: verification success), the document management server 205 determines that the verification has succeeded and proceeds to the processing of steps S2410 and S2411.

The document management server 205 acquires the public key $X_2$ (step S2410). Then, the document management server 205 determines whether the received signature $\sigma_2$ is valid or not on the basis of the public key $X_2$ (step S2411).

Here, in a case where the received signature $\sigma_2$ is not valid (step S2411: verification failure), the document management server 205 transmits the verification failure notification to the signature-side terminal 202. Then, the signature-side terminal 202 proceeds to the processing of step S2412. On the other hand, in a case where the received signature $\sigma_2$ is valid (step S2411: verification success), the document management server 205 determines that the verification has succeeded and proceeds to the processing of step S2413.

In step S2412, when receiving the verification failure notification, the signature-side terminal 202 regenerates the signature $\sigma_2$ (step S2412). Then, the signature-side terminal 202 returns to the processing of step S2402.

In step S2413, the document management server 205 stores the received document $m_2$, the received hash value $hs_2$, and the received signature $\sigma_2$ in the control information management table 400 of its own device (step S2413). Next, the document management server 205 transmits a notification that the document $m_2$ has been registered to the signature-side terminal 202 (step S2414).

Meanwhile, the signature-side terminal 202 receives the notification that the document $m_2$ has been registered (step S2415). Thereafter, the signature control system 200 terminates the document approval processing.

(Document Authorization Processing Procedure)

Next, an example of a document authorization processing procedure executed by the signature control system 200 will be described with reference to FIG. 25. The document authorization processing is implemented by, for example, the CPU 301, a storage area such as the memory 302 or the recording medium 305, the network I/F 303 illustrated in FIG. 3, and the like.

FIG. 25 is a flowchart illustrating an example of a document authorization processing procedure. In FIG. 25, the document management server 205 transmits the stored document $m_2$, hash value $hs_2$, and signature $\sigma_2$ to the signature-side terminal 203 corresponding to the authorizer (step S2501).

Next, the signature-side terminal 203 receives the document $m_2$, the hash value $hs_2$, and the signature $\sigma_2$ (step S2502). Then, the signature-side terminal 203 generates a document $m_3$ (step S2503). Then, the signature-side terminal 203 generates a hash value $hs_3$ on the basis of the hash value $hs_2$ and the document $m_3$ (step S2504).

Next, the signature-side terminal 203 obtains a private key $x_3$ (step S2505). Then, the signature-side terminal 203 generates a signature $\sigma_3$ for the document $m_3$ on the basis of the private key $x_3$ (step S2506). Then, the signature-side terminal 203 transmits the document $m_3$, the hash value $hs_3$, and the signature $\sigma_3$ to the document management server 205 (step S2507).

Meanwhile, the document management server 205 receives the document $m_3$, the hash value $hs_3$, and the signature $\sigma_3$ from the signature-side terminal 203 (step S2508). Then, the document management server 205 determines whether the received hash value $hs_3$ corresponds to the hash value $hs_2$ and the received document $m_3$ or not (step S2509).

Here, in a case where the received hash value $hs_3$ does not correspond to the hash value $hs_2$ and the received document $m_3$ (step S2509: verification failure), the document management server 205 transmits a verification failure notification to the signature-side terminal 203. Then, the signature-side terminal 203 proceeds to the processing of step S2512. On the other hand, in a case where the received hash value $hs_3$ corresponds to the hash value $hs_2$ and the received document $m_3$ (step S2509: verification success), the document management server 205 determines that the verification has succeeded and proceeds to the processing of steps S2510 and S2511.

The document management server 205 acquires the public key $X_3$ (step S2510). Then, the document management server 205 determines whether the received signature $\sigma_3$ is valid or not on the basis of the public key $X_3$ (step S2511).

Here, in a case where the received signature $\sigma_3$ is not valid (step S2511: verification failure), the document management server 205 transmits the verification failure notification to the signature-side terminal 203. Then, the signature-side terminal 203 proceeds to the processing of step S2512. On the other hand, in a case where the received signature $\sigma_3$ is valid (step S2511: verification success), the document management server 205 determines that the verification has succeeded and proceeds to the processing of step S2513.

In step S2512, when receiving the verification failure notification, the signature-side terminal 203 regenerates the signature $\sigma_3$ (step S2512). Then, the signature-side terminal 203 returns to the processing of step S2502.

In step S2513, the document management server 205 stores the received document $m_3$, the received hash value $hs_3$, and the received signature $\sigma_3$ in the control information management table 400 of its own device (step S2513). Next, the document management server 205 generates the final version of a document $m_f$ on the basis of the received document $m_3$, and stores the document $m_f$ in the control information management table 400 of its own device (step S2514). Then, the document management server 205 transmits a notification that the document $m_3$ has been registered to the signature-side terminal 203 (step S2515).

Meanwhile, the signature-side terminal 203 receives the notification that the document $m_3$ has been registered (step S2516). The signature control system 200 then terminates the document authorization processing.

(Signature Aggregation Processing Procedure)

Next, an example of a signature aggregation processing procedure executed by the signature control system 200 will be described with reference to FIG. 26. The signature aggregation processing is implemented by, for example, the CPU 301, a storage area such as the memory 302 or the recording medium 305, the network I/F 303 illustrated in FIG. 3, and the like.

FIG. 26 is a flowchart illustrating an example of a signature aggregation processing procedure. In FIG. 26, the document management server 205 transmits a notification that the document is to be transmitted to the verification-side terminal 207 (step S2601). Meanwhile, when receiving the notification, the verification-side terminal 207 transmits a request for the organization's public key certificate to the document management server 205 (step S2602).

Next, the document management server 205 transmits the digital certificate of the registered public key X' to the verification-side terminal 207 (step S2603). Meanwhile, the verification-side terminal 207 verifies the received digital certificate of the public key X' (step S2604). The verification-side terminal 207 transmits a verification failure notification to the document management server 205 in a case of verification failure. Then, the verification-side terminal 207 proceeds to the processing of step S2609.

Meanwhile, in a case of receiving the verification failure notification, the document management server 205 confirms whether the public key X' is valid or not (step S2605). The document management server 205 may regenerate the public key X' in a case where the public key X' is not valid.

Next, the document management server 205 acquires the hash value $hs_i$ and signature information (step S2606). Then, the document management server 205 generates aggregate signature information σ' on the basis of the hash value $hs_i$ and the signature information $\sigma_i$ (step S2607). Then, the document management server 205 transmits the final version of the document $m_f$ and the generated aggregate signature information σ' to the verification-side terminal 207 in association with each other (step S2608).

Meanwhile, the verification-side terminal 207 verifies the hash chain (step S2609). In a case of verification success, the verification-side terminal 207 proceeds to the processing of step S2610. The verification-side terminal 207 transmits a verification failure notification to the document management server 205 in a case of verification failure.

In step S2610, the verification-side terminal 207 verifies the aggregate signature information σ' (step S2610). In a case of verification success, the verification-side terminal 207 proceeds to the processing of step S2611. The verification-side terminal 207 transmits a verification failure notification to the document management server 205 in a case of verification failure.

In step S2611, the verification-side terminal 207 recognizes that verification of the document $m_n$ has been succeeded (step S2611).

Meanwhile, when receiving the verification failure notification, the document management server 205 investigates the cause by executing re-verification processing to be described below in FIG. 27, using Re-Verify (step S2612). The signature control system 200 then terminates the signature aggregation processing.

(Re-Verification Processing Procedure)

Next, an example of the re-verification processing procedure executed by the document management server 205 will be described with reference to FIG. 27. The re-verification processing is implemented by, for example, the CPU 301, a storage area such as the memory 302 or the recording medium 305, and the network I/F 303 illustrated in FIG. 3.

Figure 27:
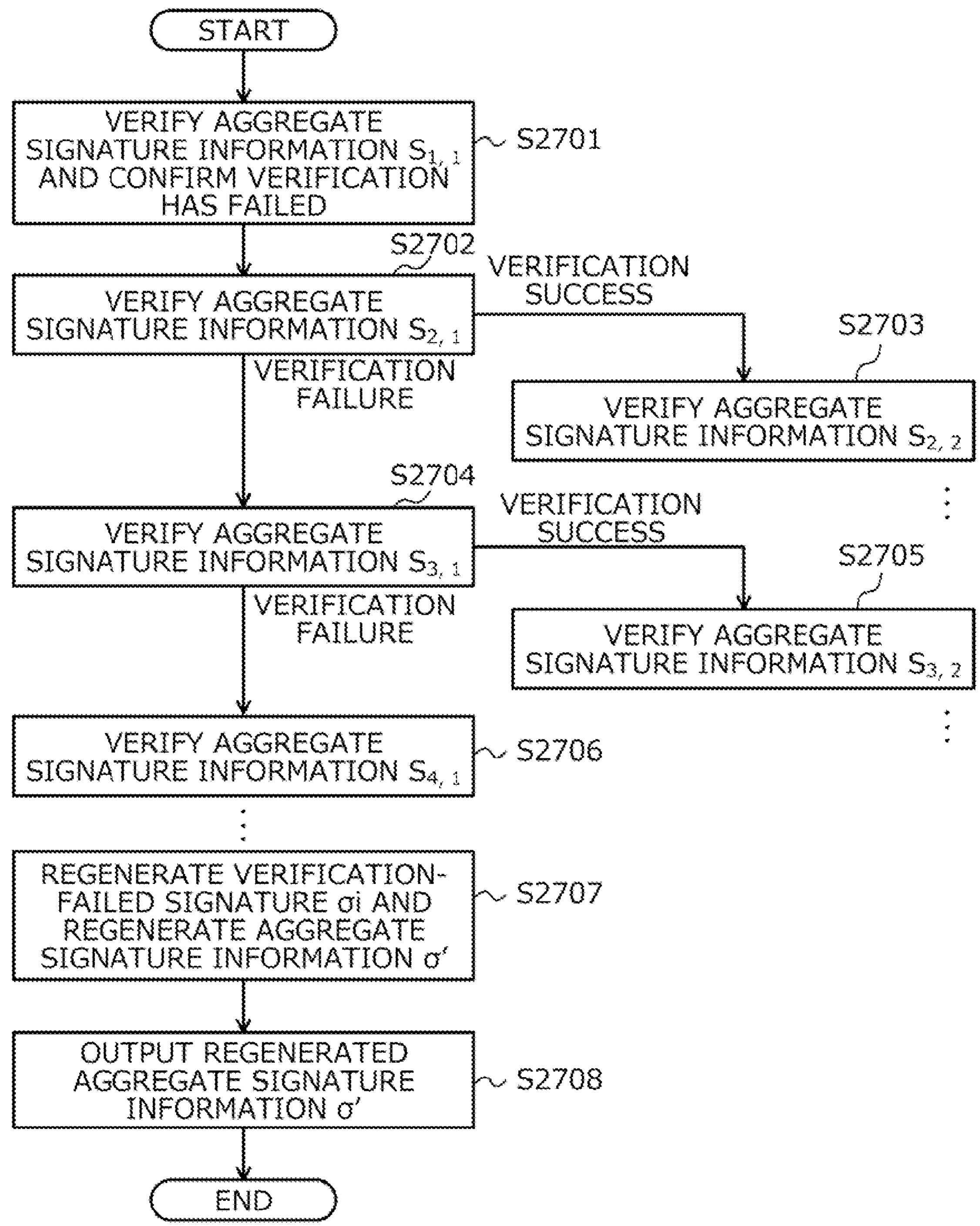
FIG. 27 is a flowchart illustrating an example of a re-verification processing procedure.

FIG. 27 is a flowchart illustrating an example of a re-verification processing procedure. In FIG. 27, the document management server 205 verifies aggregate signature information $s_{1,1}$ and confirms that the verification has failed (step S2701).

Next, the document management server 205 verifies aggregate signature information $s_{2,1}$ (step S2702). In a case of verification success, the document management server 205 proceeds to the processing of step S2703. On the other hand, in a case of verification failure, the document management server 205 proceeds to the processing of step S2704.

In step S2703, the document management server 205 verifies aggregate signature information $s_{2,2}$ (step S2703). The document management server 205 determines that an invalid signature is not present in a case of verification success, and terminates the re-verification processing. On the other hand, in a case of verification failure, the document management server 205 executes processing similar to the processing of step S2704 and subsequent steps.

In step S2704, the document management server 205 verifies aggregate signature information $s_{3,1}$ (step S2704). In a case of verification success, the document management server 205 proceeds to the processing of step S2705. On the other hand, in a case of verification failure, the document management server 205 proceeds to the processing of step S2706.

In step S2705, the document management server 205 verifies aggregate signature information $s_{3,2}$ (step S2705). The document management server 205 determines that an invalid signature is not present in a case of verification success, and terminates the re-verification processing. On the other hand, in a case of verification failure, the document management server 205 executes processing similar to the processing of step S2706 and subsequent steps.

In step S2706, the document management server 205 verifies aggregate signature information $s_{4,1}$ (step S2706). The document management server 205 recursively executes processing of verifying aggregate signature information $s_{x \geq y}$ according to the verification success and verification failure. Thereafter, the document management server 205 moves onto the processing of step S2707.

In step S2707, the document management server 205 specifies the verification-failed signature $\sigma_i$, regenerates the verification-failed signature $\sigma_i$, and regenerates the aggregate signature information σ' (step S2707). Next, the document management server 205 outputs the regenerated aggregate signature information σ' (step S2708). Then, the document management server 205 terminates the re-verification processing.

(Another Signature Aggregation Processing Procedure)

Next, an example of another signature aggregation processing procedure executed by the signature control system 200 will be described with reference to FIG. 28. The another signature aggregation processing is implemented by, for example, the CPU 301, a storage area such as the memory 302 or the recording medium 305, the network I/F 303 illustrated in FIG. 3, and the like.

FIG. 28 is a flowchart illustrating an example of another signature aggregation processing procedure. In FIG. 28, the document management server 205 transmits a notification that the document is to be transmitted to the verification-side terminal 207 (step S2801). Meanwhile, when receiving the notification, the verification-side terminal 207 transmits a request for the organization's public key certificate to the document management server 205 (step S2802).

Next, the document management server 205 transmits the digital certificate of the registered public key X' to the verification-side terminal 207 (step S2803). Meanwhile, the verification-side terminal 207 verifies the received digital certificate of the public key X' (step S2804). The verification-side terminal 207 transmits a verification failure notification to the document management server 205 in a case of verification failure. Then, the verification-side terminal 207 proceeds to the processing of step S2810.

Meanwhile, in a case of receiving the verification failure notification, the document management server 205 confirms whether the public key X' is valid or not (step S2805). The document management server 205 may regenerate the public key X' in a case where the public key X' is not valid.

Next, the document management server 205 acquires the hash value $hs_i$ and the signature information $\sigma_i$ (step S2806). Then, the document management server 205 generates aggregate signature information σ' on the basis of the hash value $hs_i$ and the signature information $\sigma_i$ (step S2807).

Next, the document management server 205 executes invalidation processing to be described below with reference to FIG. 29 (step S2808). Then, the document management server 205 transmits the final version of the document $m_n$ and the generated aggregate signature information σ' to the verification-side terminal 207 in association with each other (step S2809).

Meanwhile, the verification-side terminal 207 verifies the hash chain (step S2810). In a case of verification success, the verification-side terminal 207 proceeds to the processing of step S2811. The verification-side terminal 207 transmits a verification failure notification to the document management server 205 in a case of verification failure.

In step S2811, the verification-side terminal 207 verifies the aggregate signature information σ' (step S2811). In a case of verification success, the verification-side terminal 207 proceeds to the processing of step S2812. The verification-side terminal 207 transmits a verification failure notification to the document management server 205 in a case of verification failure.

In step S2812, the verification-side terminal 207 recognizes that verification of the document $m_n$ has been succeeded (step S2812).

Meanwhile, when receiving the verification failure notification, the document management server 205 investigates the cause by executing the re-verification processing illustrated in FIG. 27, using Re-Verify (step S2813). The signature control system 200 then terminates the signature aggregation processing.

(Invalidation Processing Procedure)

Next, an example of invalidation processing procedure executed by the document management server 205 will be described with reference to FIG. 29. The invalidation processing is implemented by, for example, the CPU 301, a storage area such as the memory 302 or the recording medium 305, and the network I/F 303 illustrated in FIG. 3.

FIG. 29 is a flowchart illustrating an example of the invalidation processing procedure. In FIG. 29, the document management server 205 determines whether there is a public key to be temporarily invalidated or not (step S2901). Here, in a case where there is no public key to be temporarily invalidated (step S2901: No), the document management server 205 terminates the invalidation processing. In a case where there is a public key to be temporarily invalidated (step S2901: Yes), the document management server 205 proceeds to processing in step S2902.

In step S2902, the document management server 205 inquires of the private CA server 204 about the public key to be invalidated (step S2902). Meanwhile, the private CA server 204 transmits the public key to be invalidated to the document management server 205 in response to the inquiry (step S2903).

The document management server 205 generates revised signature information σ" obtained by revising the aggregate signature information σ' on the basis of the public key to be invalidated (step S2904). Next, the document management server 205 outputs the revised signature information σ" (step S2905). Then, the document management server 205 terminates the invalidation processing.

As described above, according to the information processing device 100, it is possible to acquire a plurality of pieces of document information and signature information corresponding to each piece of document information of the plurality of pieces of document information. According to the information processing device 100, it is possible to generate aggregate signature information obtained by aggregating the signature information corresponding to each piece of document information of the plurality of acquired pieces of document information on the basis of the plurality of acquired pieces of document information. According to the information processing device 100, it is possible to output the generated aggregate signature information in association with the aggregate public key information obtained by aggregating the public key information corresponding to each piece of document information of the plurality of pieces of document information and the plurality of pieces of document information. Therefore, the information processing device 100 enables the aggregate signature information to be verifiable even if the number of pieces of key information to be used when verifying the aggregate signature information is one and can reduce the cost incurred when verifying the aggregate signature information.

According to the information processing device 100, it is possible to generate the aggregate public key information on the basis of the public key information corresponding to each piece of document information of the plurality of acquired pieces of document information. Therefore, the information processing device 100 can reduce the number of pieces of key information to be used when verifying the aggregate signature information, and can reduce the cost incurred when verifying the aggregate signature information.

According to the information processing device 100, it is possible to generate the aggregate signature information on the basis of the hash value corresponding to each piece of document information of the plurality of acquired pieces of document information. Therefore, the information processing device 100 can generate the aggregate signature information obtained by aggregating the signature information based on the hash value.

According to the information processing device 100, it is possible to enable the validity of the generated aggregate signature information to be verifiable on the basis of the plurality of acquired pieces of document information, the generated aggregate signature information, and the generated aggregate public key information. Therefore, the information processing device 100 enables the aggregate signature information to be verifiable even if the number of pieces of key information to be used when verifying the aggregate signature information is one and can reduce the cost incurred when verifying the aggregate signature information.

According to the information processing device 100, it is possible to receive the aggregate signature information and the aggregate public key information associated with the plurality of pieces of document information. According to the information processing device 100, it is possible to verify the validity of the received aggregate signature information on the basis of the plurality of pieces of document information, the received aggregate signature information, and the received aggregate public key information. Therefore, the information processing device 100 can verify the validity of the aggregate signature information, confirm whether the plurality of pieces of document information have been falsified or not, and improve security.

According to the information processing device 100, it is possible to detect that the aggregate signature information is not valid. According to the information processing device 100, it is possible to acquire two pieces of aggregate signature information: aggregate signature information obtained by aggregating some pieces of signature information; and aggregate signature information obtained by aggregating pieces of signature information other than the some pieces of signature information, among the pieces of signature information that are aggregation sources of the aggregate signature information. According to the information processing device 100, it is possible to output a result of verifying the validity of each of the acquired two pieces of aggregate signature information. Therefore, the information processing devices 100 can specify any piece of signature information serving as an aggregation source that causes the aggregate signature information to be invalid.

According to the information processing device 100, it is possible to detect that at least one piece of aggregate signature information, of the acquired two pieces of aggregate signature information, is not valid. According to the information processing device 100, it is possible to newly acquire two pieces of aggregate signature information: aggregate signature information obtained by aggregating some pieces of signature information; and aggregate signature information obtained by aggregating pieces of signature information other than the some pieces of signature information, among the pieces of signature information that are aggregation sources of any piece of the aggregate signature information. According to the information processing device 100, it is possible to output a result of verifying the validity of each of the newly acquired two pieces of aggregate signature information. Therefore, the information processing devices 100 can specify any piece of signature information serving as an aggregation source that causes the aggregate signature information to be invalid.

According to the information processing device 100, it is possible to generate aggregate public key information obtained by aggregating the public key information corresponding to each piece of document information of the plurality of acquired pieces of document information, and public key information not corresponding to any document information of the plurality of acquired pieces of document information. According to the information processing device 100, it is possible to generate revised signature information obtained by revising the generated aggregate signature information on the basis of the public key information not corresponding to any document information. According to the information processing device 100, it is possible to output the generated revised signature information in association with the aggregate public key information and the plurality of acquired pieces of document information. Therefore, the information processing device 100 can generate the verifiable revised signature information on the basis of the aggregate public key information even if there is no signature information based on any public key information.

According to the information processing device 100, it is possible to generate the aggregate public key information on the basis of the public key information corresponding the private key information to be used when generating the signature information corresponding to each piece of document information of the plurality of acquired pieces of document information. Therefore, the information processing device 100 can aggregate the public key information capable of verifying the signature information and can generate the aggregate public key information.

According to the information processing device 100, it is possible to adopt pieces of document information indicating respective versions of a plurality of versions of the first document. Therefore, the information processing device 100 can be applied to a situation where the document is being revised.

According to the information processing device 100, it is possible to output the hash value generated on the basis of the hash chain formed with the seed and the hash value corresponding to each version of the first document in association with the aggregate signature information. Therefore, the information processing device 100 can confirm whether a plurality of pieces of document information has been falsified, and improve security.

According to the information processing device 100, it is possible to generate the aggregate signature information on the basis of a safe prime and the hash value corresponding to each piece of document information of the plurality of acquired pieces of document information. Therefore, the information processing device 100 can reduce the processing time spent on generating the aggregate signature information.

According to the information processing device 100, it is possible to generate the aggregate signature information using the Schnorr signature algorithm. Therefore, the information processing device 100 can generate the aggregate signature information obtained by aggregating the signature information based on the Schnorr signature algorithm.

According to the information processing device 100, it is possible to output the generated aggregate signature information in association with the aggregate public key information and the plurality of acquired pieces of document information to the verifier for the plurality of acquired pieces of document information. Therefore, the information processing device 100 enables the verifier to verify the validity of the aggregate signature information and to confirm whether the plurality of pieces of document information has been falsified or not, and can improve the security.

According to the information processing device 100, it is possible to associate the document information, the public key information, and the signature information with each other, for each predetermined signer. Therefore, the information processing device 100 can easily generate the aggregate signature information and the aggregate public key information.

According to the information processing device 100, it is possible to receive aggregate signature information associated with a plurality of pieces of document information from a device that generates the aggregate signature information obtained by aggregating signature information corresponding to each piece of document information of the plurality of pieces of document information. According to the information processing device 100, it is possible to receive aggregate public key information associated with a plurality of pieces of document information from a device that generates the aggregate public key information obtained by aggregating public key information corresponding to each piece of document information of the plurality of pieces of document information. According to the information processing device 100, it is possible to verify the validity of the received aggregate signature information on the basis of the plurality of pieces of document information, the received aggregate signature information, and the received aggregate public key information. Therefore, the information processing device 100 can verify the validity of the aggregate signature information, confirm whether the plurality of pieces of document information have been falsified or not, and improve security.

Note that the signature control method described in the present embodiment may be implemented by executing a program prepared in advance, on a computer such as a PC or a workstation. The signature control program described in the present embodiment is executed by being recorded on a computer-readable recording medium and being read from the recording medium by the computer. The recording medium is a hard disk, a flexible disk, a compact disc (CD)-ROM, a magneto optical disc (MO), a digital versatile disc (DVD), or the like. Furthermore, the signature control program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A signature control method implemented by a computer, for use in a digital workflow system managing a plurality of electronic documents, each electronic document being signed by a corresponding signer of multiple signers using a digital signature technology, the signature control method comprising:

acquiring, by a processor circuit of the computer, a plurality of pieces of document information and a plurality of pieces of signature information, each of the plurality of pieces of signature information including a respective digital signature generated from a corresponding piece of document information of the plurality of pieces of document information, each of the plurality of pieces of document information including a corresponding electronic document selected from among the plurality of electronic documents;

generating, by the processor circuit of the computer, aggregated signature information including an aggregated digital signature obtained by aggregating the plurality of pieces of signature information into the aggregated signature information by a modulo operation;

acquiring, by the processor circuit of the computer, aggregated public key information generated by aggregating a plurality of pieces of public key information into the aggregated public key information by a modulo operation to ensure that a length of the aggregated public key information is equal to a length of any one of the plurality of pieces of public key information, each of at least some pieces of the plurality of pieces of public key information being associated with a corresponding piece of document information of the plurality of pieces of document information;

receiving another public key information that is any one of the plurality pieces of public key information and that is not associated with any piece of document information of the plurality of acquired pieces of document information, wherein the another public key information corresponds to a signer who is temporarily unavailable to generate a digital signature for a corresponding piece of document information that is not included in the plurality of pieces of document information;

generating revised aggregated signature information by revising the generated aggregated signature information on a basis of the another public key information, wherein the revising of the aggregated signature information includes generating a correction factor based on: the another public key information and hash values of the plurality of pieces of document information, and multiplying the aggregated signature information by the generated correction factor; and outputting the revised aggregated signature information in association with the aggregated public key information and the plurality of acquired pieces of document information, wherein the aggregated public key information is used to verify validity of the revised aggregated signature information to ensure that the plurality of pieces of document information have not been tampered with.

2. The signature control method according to claim 1, the signature control method further comprising:

performing the aggregating of the public key information to generate the aggregated public key information on a basis of the public key information.

3. The signature control method according to claim 1, wherein the generating of the aggregated signature information includes:

obtaining a plurality of hash values corresponding to the plurality of pieces of document information, each of the plurality of hash values being a hash value generated by inputting to a hash function a corresponding piece of document information of the plurality of acquired pieces of document information; and generating the aggregated signature information on a basis of the plurality of hash values corresponding to the plurality of pieces of document information.

4. The signature control method according to claim 1, the signature control method further comprising:

receiving, in association with the plurality of pieces of document information, the revised aggregated signature information and the aggregated public key information; and verifying validity of the received revised aggregated signature information using the received aggregated public key information to ensure that the plurality of pieces of document information have not been tampered with, wherein the verifying includes:

calculating a first value using a part of the revised aggregated signature information;

calculating a second value using another part of the revised aggregated signature information, the aggregated public key information, and the plurality of pieces of document information;

when the first value matches with the second value, determining that the received revised aggregated signature information is valid; otherwise, determining that the received revised aggregated signature information is not valid.

5. The signature control method according to claim 2, wherein each piece of public key information of at least some pieces of the plurality of pieces of public key information is paired with private key information used when generating, among the plurality of pieces of signature information, signature information that corresponds to a corresponding piece of document information of the plurality of acquired pieces of document information.

6. The signature control method according to claim 1, wherein the plurality of pieces of document information includes pieces of document information that indicates respective versions of a plurality of versions of a first document.

7. The signature control method according to claim 6, wherein the outputting includes outputting, in association with the aggregated signature information, a hash value generated on a basis of a hash chain formed from a seed and a hash value that corresponds to the each version of the first document.

8. The signature control method according to claim 1, wherein the generating of the aggregated signature information includes generating the aggregated signature information on a basis of a safe prime and a plurality of hash values, each of the plurality of hash values being a value obtained by inputting, to a hash function, a corresponding piece of document information of the plurality of acquired pieces of document information.

9. The signature control method according to claim 1, wherein the generating of the aggregated signature information includes generating the aggregated signature information using a Schnorr signature algorithm.

10. The signature control method according to claim 1, wherein the document information, the public key information, and the signature information are associated with each predetermined signer.

11. A non-transitory computer-readable storage medium storing a signature control program, for use in a digital workflow system managing a plurality of electronic documents, each electronic document being signed by a corresponding signer of multiple signers using a digital signature technology, the signature control program comprising instructions which, when executed by a computer, cause the computer to execute processing comprising:

acquiring a plurality of pieces of document information and a plurality of pieces of signature information, each of the plurality of pieces of signature information including a respective digital signature generated from a corresponding piece of document information of the plurality of pieces of document information, each of the plurality of pieces of document information including a corresponding electronic document selected from among the plurality of electronic documents;

generating aggregated signature information including an aggregated digital signature obtained by aggregating the plurality of pieces of signature information into the aggregated signature information by a modulo operation;

acquiring aggregated public key information generated by aggregating a plurality of pieces of public key information into the aggregated public key information by a modulo operation to ensure that a length of the aggregated public key information is equal to a length of any one of the plurality of pieces of public key information, each of at least some pieces of the plurality of pieces of public key information being associated with a corresponding piece of document information of the plurality of pieces of document information;

receiving another public key information that is any one of the plurality pieces of public key information and that is not associated with any piece of document information of the plurality of acquired pieces of document information, wherein the another public key information corresponds to a signer who is temporarily unavailable to generate a digital signature for a corresponding piece of document information that is not included in the plurality of pieces of document information, generating revised aggregated signature information obtained by revising the generated aggregated signature information on a basis of the another public key information, wherein the revising of the aggregated signature information includes generating a correction factor based on: the another public key information and hash values of the plurality of pieces of document information, and multiplying the aggregated signature information by the generated correction factor, and outputting the revised aggregated signature information in association with the aggregated public key information and the plurality of acquired pieces of document information, wherein the revised aggregated signature information and the aggregated public key information are used to verify validity of the revised aggregated signature information to ensure that the plurality of pieces of document information have not been tampered with.

12. An information processing apparatus of signature control, for use in a digital workflow system managing a plurality of electronic documents, each electronic document being signed by a corresponding signer of multiple signers using a digital signature technology, the information processing apparatus comprising:

a memory; and a processor circuit coupled to the memory, the processor circuit being configured to perform processing including:

acquiring a plurality of pieces of document information and a plurality of pieces of signature information, each of the plurality of pieces of signature information including a respective digital signature generated from a corresponding piece of document information of the plurality of pieces of document information, each of the plurality of pieces of document information including a corresponding electronic document selected from among the plurality of electronic documents;

generating aggregated signature information including an aggregated digital signature obtained by aggregating the plurality of pieces of signature information into the aggregated signature information by a modulo operation;

acquiring, aggregated public key information generated by aggregating a plurality of pieces of public key information into the aggregated public key information by a modulo operation to ensure that a length of the aggregated public key information is equal to a length of any one of the plurality of pieces of public key information, each of at least some pieces of the plurality of pieces of public key information being associated with a corresponding piece of document information of the plurality of pieces of document information;

receiving another public key information that is any one of the plurality pieces of public key information and that is not associated with any piece of document information of the plurality of acquired pieces of document information, wherein the another public key information corresponds to a signer who is temporarily unavailable to generate a digital signature for a corresponding piece of document information that is not included in the plurality of pieces of document information;

generating revised aggregated signature information obtained by revising the generated aggregated signature information on a basis of the another public key information, wherein the revising of the aggregated signature information includes generating a correction factor based on: the another public key information and hash values of the plurality of pieces of document information, and multiplying the aggregated signature information by the generated correction factor; and outputting the revised aggregated signature information in association with the aggregated public key information and the plurality of acquired pieces of document information, wherein the revised aggregated signature information and the aggregated public key information are used to verify validity of the revised aggregated signature information to ensure that the plurality of pieces of document information have not been tampered with.

13. A signature control method implemented by a computer, for use in a digital workflow system managing a plurality of electronic documents, each electronic document being signed by a corresponding signer of multiple signers using a digital signature technology, the signature control method comprising:

receiving revised aggregated signature information associated with a plurality of pieces of document information from a device that generates the aggregated signature information including an aggregated digital signature obtained by aggregating a plurality of pieces of signature information into the aggregated signature information by a modulo operation and generates the revised aggregated signature information by revising the generated aggregated signature information on a basis of another public key information, the another public key information being public key information that is any one of a plurality pieces of public key information and that is not associated with any piece of document information of the plurality of pieces of document information and that corresponds to a signer who is temporarily unavailable to generate a digital signature for a corresponding piece of document information that is not included in the plurality of pieces of document information, each of the plurality of pieces of signature information including a respective digital signature generated from a corresponding piece of document information of the plurality of pieces of document information, each of the plurality of pieces of document information including a corresponding electronic document selected from among the plurality of electronic documents, wherein the revising of the aggregated signature information includes generating a correction factor based on: the another public key information and hash values of the plurality of pieces of document information, and multiplying the aggregated signature information by the generated correction factor;

receiving aggregated public key information associated with the plurality of pieces of document information from a device that generates the aggregated public key information obtained by aggregating a plurality of pieces of public key information into the aggregated public key information by a modulo operation to ensure that a length of the aggregated public key information is equal to a length of any one of the plurality of pieces of public key information, each of at least some pieces of the plurality of pieces of public key information being associated with a corresponding piece of document information of the plurality of pieces of document information; and verifying validity of the received revised aggregated signature information using the received aggregated public key information to ensure that the plurality of pieces of document information have not been tampered with.

* * * * *